United States Patent [19]

Lynch et al.

[11] 4,262,791

[45] Apr. 21, 1981

[54] DRAW RATE SIGNAL GENERATOR

[75] Inventors: Charles R. Lynch, Port Neches; Charles W. Harrison; William D. White, both of Nederland, all of Tex.

[73] Assignee: Texaco Inc., White Plains, N.Y.

[21] Appl. No.: 78,347

[22] Filed: Sep. 24, 1979

[51] Int. Cl.³ .................. B01D 3/42; G06F 15/46; G06G 7/58

[52] U.S. Cl. .................... 196/132; 202/160; 203/1; 203/3; 203/DIG. 19; 208/DIG. 1; 208/350; 364/116; 364/501; 422/62; 422/119

[58] Field of Search ................. 196/132; 208/DIG. 1, 208/350; 203/DIG. 18, 1, 2, 3, DIG. 19, 99; 202/160; 364/501, 500, 116; 422/62, 119

[56] References Cited

U.S. PATENT DOCUMENTS

| | | | |
|---|---|---|---|
| 3,259,554 | 7/1966 | Constantikes | 196/132 |
| 3,394,053 | 7/1968 | Shinskey | 364/501 |
| 3,546,109 | 12/1970 | Woodle | 196/132 |
| 3,964,975 | 6/1976 | Harrisons et al. | 202/160 |
| 3,997,432 | 12/1976 | Louvel et al. | 196/132 |
| 4,161,427 | 7/1979 | Sequeira et al. | 364/501 |
| 4,166,770 | 9/1979 | Anderson et al. | 202/160 |

Primary Examiner—Wilbur L. Bascomb, Jr.
Attorney, Agent, or Firm—Carl G. Ries; Robert A. Kulason; Ronald G. Gillespie

[57] ABSTRACT

A draw rate signal generator for an atmospheric crude distillation unit receiving crude oil and providing streams 1 through 5 and a reduced crude oil includes flow rate sensors sensing the flow rates of the crude oil and of streams 1 through 4 and providing corresponding signals. Analyzers sample the crude oil and provide signals corresponding to the 35% point temperature, the API gravity and the vapor pressure of the crude oil. End point analyzers sample streams Nos. 1 and 3 and provide signals representative of the end point temperatures of streams Nos. 1 and 3, respectively. 50% point analyzers sample streams 2, 3 and 4 and provide signals corresponding to the 50% point temperatures of streams Nos. 2, 3 and 4, respectively. A circuit connected to the sensors, to the crude analyzers, to the end point analyzers and to the 50% analyzers provide signals corresponding to the draw rates for streams Nos. 1 through 5 in accordance with signals from the sensors and analyzers.

22 Claims, 20 Drawing Figures

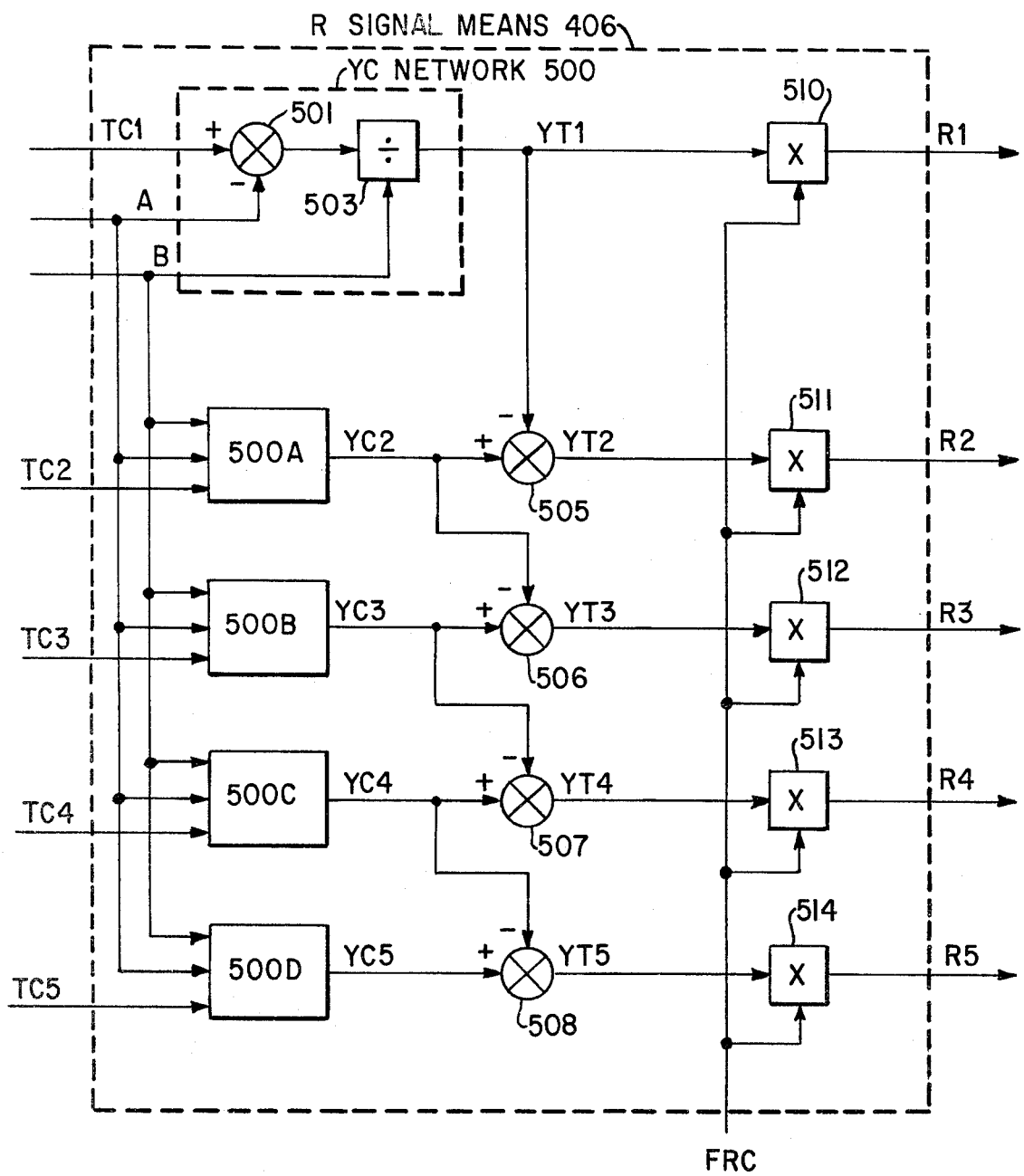

DRAW RATE SIGNAL GENERATOR

BACKGROUND OF THE INVENTION

Field of the Invention

The present invention relates to signal generators in general and, more particularly, to signal generators for process control systems.

SUMMARY OF THE INVENTION

A draw rate signal generator for an atmospheric crude distillation unit receiving crude oil and providing streams 1 through 5 and a reduced crude oil includes flow rate sensors sensing the flow rates of the crude oil and the flow rates of streams 1 through 4 and providing corresponding signals. Analyzers sample the crude oil and provide signals corresponding to the 35% point temperature, the API gravity and the vapor pressure of the crude oil. End point analyzers sample streams Nos. 1 and 3 and provide signals representative of the end point temperatures of streams Nos. 1 and 3, respectively. 50% point analyzers sample streams 2, 3 and 4 and provide signals corresponding to the 50% point temperatures of streams Nos. 2, 3 and 4, respectively. A network connected to the flow rate sensors and to all the analyzers provides signals corresponding to the draw rates for streams Nos. 1 through 5 in accordance with the signals from the sensors and the analyzers.

The objects and advantages of the invention will appear more fully hereinafter from a consideration of the detailed description which follows, taken together with the accompanying drawings which follow, wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 17, 18, 19 and 20 are detailed block diagrams of the T5 & TEP signal means, the IBP signal means, the TC signal means and the R signal means, respectively, shown in FIG. 16.

DESCRIPTION OF THE INVENTION

Figure 1:
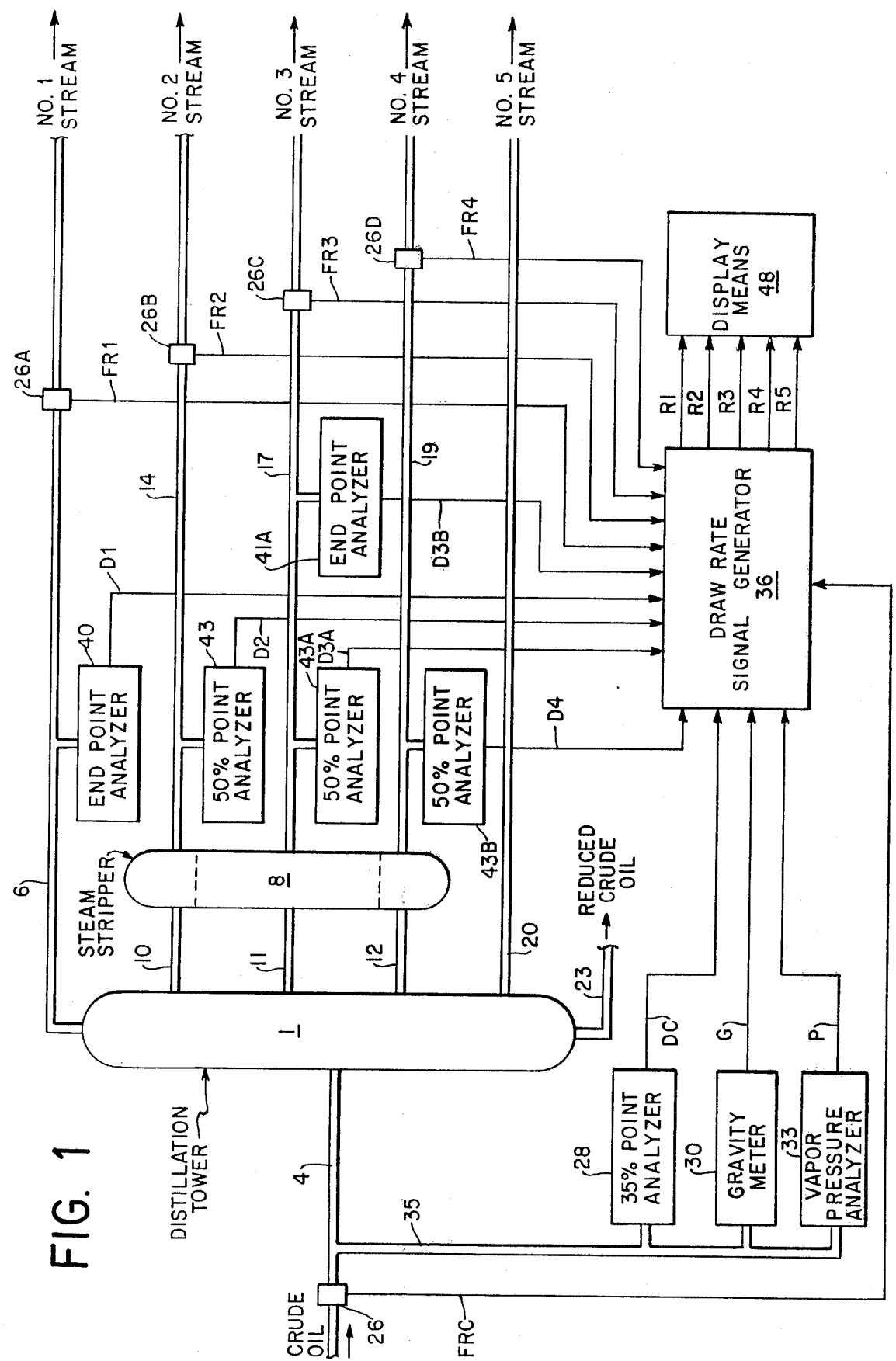
FIG. 1 shows an atmospheric crude distillation unit in partial schematic form and a signal generator, constructed in accordance with the present invention, shown in simplified block diagram form, for providing signals corresponding to draw rates for streams Nos. 1 through 5.

The following equations are utilized in developing the draw rate signals for an atmospheric crude distillation unit.

$$YAn = (Fn/FRC)(100) \qquad 1.$$

where Yan is the actual yield of the nth cut, Fn is the flow rate of the nth cut and FRC is the flow rate of the crude oil.

$$X1 = YA1, \qquad 2.$$

$$X2 = YA1 + (0.5)(YA2), \qquad 3.$$

$$X3A = YA1 + YA2 + (0.5)(YA3), \qquad 4.$$

$$X3B = YA1 + YA2 + YA3, \text{ and} \qquad 5.$$

$$X4 = YA1 + YA2 + YA3 + (0.5)(YA4) \qquad 6.$$

where X1, X2, X3A, X3B and X4 are cummulative yields at the end point temperature of cut 1, the 50% point temperature of cut 2, the 50% point temperature of cut 3, the end point temperature of cut 3, and the 50% point temperature of cut 4, respectively.

$$BFB = [5\epsilon(XnDn) = (\epsilon Xn)(\epsilon Dn)]/[5\epsilon(Xn)^2 - (\epsilon Xn)^2] \qquad 7.$$

where Dn is the end point temperature or the 50% point temperature of nth cut and the BFB is the slope component of the feed back distillation curve defined by the following equation:

$$TFB = AFB + (BFB)(Y), \qquad 8.$$

where TFB is the feedback distillation temperature, AFB is the intercept component of the feedback distillation curve and Y is the yield.

$$AFB = [\epsilon Dn = (BFB)(\epsilon Xn)]/5 \qquad 9.$$

The standard error of estimate $\sigma$FB for the feedback curve is developed as follows:

$$TnFB = AFB + (BFB)(Xn), \qquad 10.$$

$$\Delta nFB = Tn - Dn, \text{ and} \qquad 11.$$

$$\sigma FB = \sqrt{\epsilon (\Delta n)^2/(5-2)} \qquad 12.$$

where Tn is the temperature of the nth cut, and $\Delta$n is the difference between the computed temperature and actual temperature of the nth cut.

Development of a feedforward distillation curve follows similar lines.

$$E1 = 0.5(90 + Dl) \qquad 13.$$

where E1 is the 50% temperature of the No. 1 cut assuming a 90° F. initial boiling point (IBP).

$$Z1 = \{[(C2)(E1) - C3]P + (C4)(E1) - C5\}/2 \qquad 14.$$

where Z1 is the estimated yield of the No. 1 cut at its 50% point, P is the Reid vapor pressure of the crude and C2 through C5 are constants having preferred values of 0.0377, 4.48, 0.0715 and 7.2.

E2, the 35% point temperature of the crude, is equal to $D_c$ while $Z_2$, the yield of overhead material at this point, is, by definition, 35. Similarly $Z_3$, the yield of overhead material at the 50% point of the crude, is, by definition, 50. The estimated 50% point temperature of the crude is determined from the following equation 15:

$$E3 = C7 - (C8)(G) + (C9)(G)^2, \qquad 15.$$

where G is the API gravity of the crude oil and C7 through C9 are constants having preferred values of 1215, 21.6 and 0.06651.

The slope BFF and the intercept AFF of the distillation feedforward curve as determined from equations 16 and 17.

$$BFF = [(3)(\epsilon EnZn) - (\epsilon En)(\epsilon Zn)] / [(3)\epsilon(Zn)^2 - (\epsilon Zn)^2], \qquad 16.$$

$$AFF = [\epsilon En - (BFF)(\epsilon Zn)] / 3. \qquad 17.$$

The distillation feedforward curve is defined by equation 18:

$$TFF = AFF + (BFF)(Y). \qquad 18.$$

The standard error of estimate utilizes equations 19, 20 and 21.

$$TnFF = AFF + (BFF)(Zn), \qquad 19.$$

$$\Delta nFF = (TnFF) - En, \text{ and} \qquad 20.$$

$$\sigma FF = \sqrt{\epsilon (\Delta nFF)2} \qquad 21.$$

where $\sigma FF$ is the standard error of estimate for the feed-forward distillation curve.

The target cut points are determined from the following equations:

$$TEP = C10 + (C11)(Ts) + (C12)(Ts)^2 - (C21)(TS)^4, \qquad 22.$$

where TEP is the calculated true boiling point end point for a stream which corresponds to the desired American Society for Testing and Materials (ASTM) end point for the stream, Ts is the desired ASTM end point and C10 through C12 and C21 are constants having preferred values of 94.96340, 0.55777931 $0.65788563 \times 10^{-3}$ and $0.2380693 \times 10^{-9}$, respectively.

$$T95 = C13 + (C14)(TEP) - (C15)(TEP)^2 + (C16)(TEP)^5, \qquad 23.$$

where T95 is the ASTM 95% point temperature for a stream, and C13 through C16 are constants having preferred values of $-67.90656$, $1.224821$, $0.31855362 \times 10^{-3}$ and $0.66230529 \times 10^{-13}$ respectively.

$$T5(n+1) = T95(n) + GAP_n \qquad 24.$$

where $T5(n+1)$ is the 5% point for the $(n+1)$ stream, T95(n) is the 95% point from the (nth) stream, and $GAP_n$ is the expected difference, °F., between the 95% point of the nth stream and the 5% point of the $(n+1)$ stream based on past experience with the atmospheric crude distillation unit.

$$IBP = C17 + (C18)(T5) - (C19)(T5)^3 + C20(T5)^5, \qquad 25.$$

where IBP is the true initial boiling point temperature of a stream and C17, C18, C19 and C20 are constants having preferred values of $-62.28654$, $1.1077052$, $0.24462146 \times 10^{-6}$, and $0.51959908 \times 10^{-12}$, respectively.

The target cut point TCn of the nth stream is determined from equation 26:

$$TCn = [TEPn + TIBP(n+1)]/2. \qquad 26.$$

The cummulative yield Ycn at the end of the nth stream is determined from equation 27:

$$Ycn = (TCn - A)/B \qquad 27.$$

where A and B are AFF and BFF or AFB and BFB depending on whether the feedforward or the feedback distillation curve is being used.

The target yield YTn of the nth stream is determined using equation 28:

$$YTn = YCn - YC(n-1), \qquad 28.$$

while the expected draw rate Rn for the nth stream is determined from the following equation:

$$Rn = [(YTn)(Fc)]/100 \qquad 29.$$

Referring to FIG. 1, a distillation tower 1 in an atmospheric crude distillation unit receives crude oil by way of a line 4 and provides a number 1 stream by way of a line 6. Drawoff is also provided to a steam stripper 8 by way of lines 10, 11 and 12. Steam stripper 8 provides streams Nos. 2, 3 and 4 by way of lines 14, 17 and 19. Distillation tower 1 provides stream No. 5 by way of line 20 and reduced crude by way of line 23.

A conventional type flow transmitter 26 senses the flow rate of the crude oil in line 4 and provides a corresponding signal FRC. A 35% point analyzer 28, a gravity meter 30 and a vapor pressure analyzer 33 sample the crude oil in line 4 by way of a line 35 and provides signals DC, G and P, respectively, to a draw rate signal generator 36 also receiving signal FRC.

Flow transmitters 26A, 26B, 26C and 26D sense the stream flows in lines 6, 14, 17 and 19, respectively, and provide signals FR1, FR2, FR3 and FR4, respectively, to draw rate signal generator 36, corresponding to the flow rates of streams 1, 2, 3 and 4, respectively.

An end point analyzer 40 samples the No. 1 stream in line 6 to provide a signal D1 corresponding to the end point of the No. 1 stream. Fifty percent point analyzers 43, 43A and 43B sample streams Nos. 2, 3 and 4 in lines 14, 17 and 19, respectively, and provide signals D2, D3A and D4 corresponding to the 50% points of streams 2, 3 and 4, respectively. An end point analyzer 41A samples No. 3 stream and provides a corresponding signal D3B, corresponding to the end point of the No. 3 stream.

Draw rate signal generator 36 develops signals R1, R2, R3, R4 and R5, corresponding to the draw rates for streams 1, 2, 3, 4 and 5, respectively, and provides them to display means 48. It should be noted that signals R1, R2, R3, R4 and R5 may also be used for control of the distillation tower. However, in the present application, they are being used to provide a display of the draw rates for those streams for an operator's control of the tower.

Figure 2:
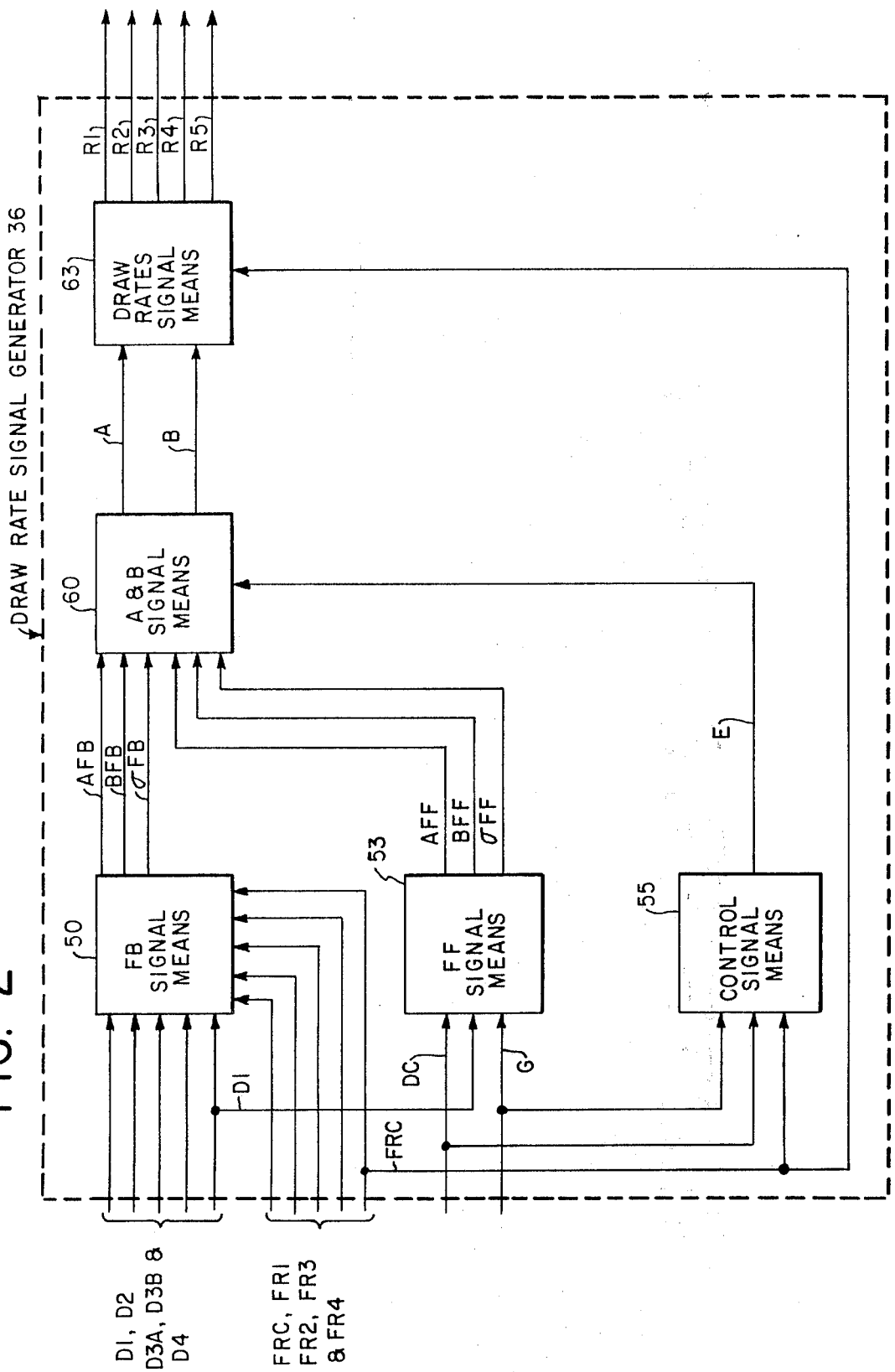
FIG. 2 is a simplified block diagram of the draw rate signal generator shown in FIG. 1.

Referring now to FIG. 2, draw rate signal generator 36 develops draw rate signals R1 through R5 to meet several conditions. First, if there is a change in the 35% point analyzer signal, if there is a change in the crude oil's gravity or a change in the flow of the crude oil to distillation tower 1, draw rate signal generator 36 will develop new draw rate signals. Ideally, the draw rate signals are developed from a feed back curve using sensed properties but in a situation where there is a change and the feed back has not stabilized to the point that feedback control can be used, draw rate signal generator 36 provides the draw rate signals in accordance with a feed forward curve developed from the parameters of the crude oil entering distillation tower 1. Draw rate signal generator 36 includes FB signal means 50 receiving signals D1, D2, D3A, D3B, D4, FRC, FR1, FR2, FR3 and FR4 and provides signals AFB, BFB and $\sigma$FB as hereinafter explained. Signals AFB and BFB correspond to the intercept and slope, respectively, of the feedback curve.

FF signal means 53 receives signals D1, DC and G and provides signal AFF, BFF and $\sigma$FF, as hereinafter explained. Signals AFF and BFF correspond to the intercept and slope, respectively, of the feed forward curve.

Control signal means 55 receives signals DC, G and FRC and provides a control signal E, as hereinafter explained.

A and B signal means 60 receives signals AFB, BFB $\sigma$FB, AFF, BFF and $\sigma$FF and control pulse E1 and provides signals A and B, as hereinafter explained, to draw rate signal means 63 which also receives signal FRC and provides signals R1 through R5 as hereinafter explained.

Figure 3:
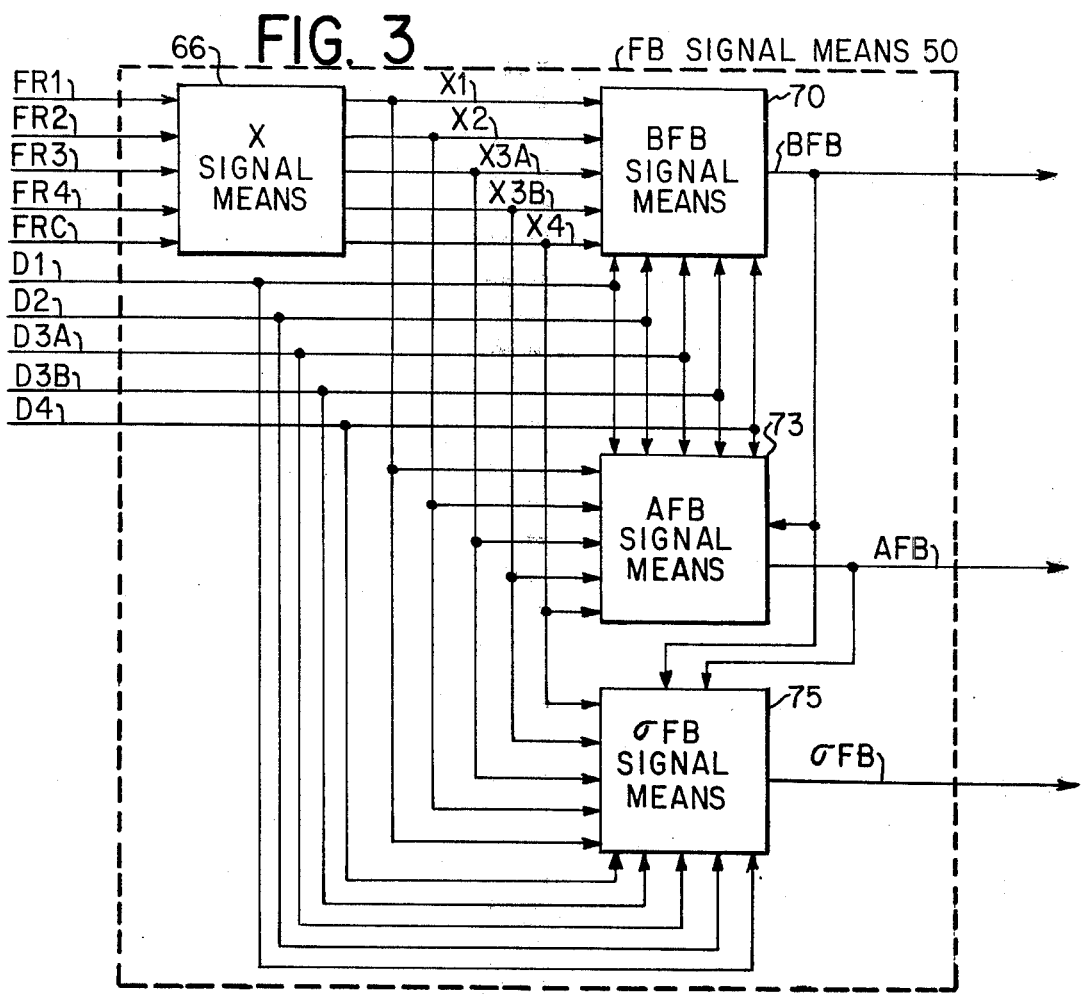
FIGS. 3, 8, 14, 15 and 16 are simplified block diagrams of the FB signal means, the FF signal means, the control signal means the A & B signal means and the draw rate signal means, respectively, shown in FIG. 2.

Referring now to FIG. 3, FB signal means 50 includes X signal means 66, receiving signals FR1 through FR4 and FRC and provides signals X1, X2, X3A, X3B and X4, to BFB signal means 70, AFB signal means 73 and $\sigma$FB signal means 75. BFB signal means 70, AFB signal means 73 and $\sigma$FB signal means 75 also receive signals D1, D2, D3A, D3B and D4, while AFB signal means 73 also receives signals BFB and $\sigma$FB signal means 75 receives signals AFB and BFB. BFB signal means 70, AFB signal means 73 and $\sigma$FB signal means 75 provide signals BFB, AFB and $\sigma$FB, respectively, as hereinafter explained.

Figure 4:
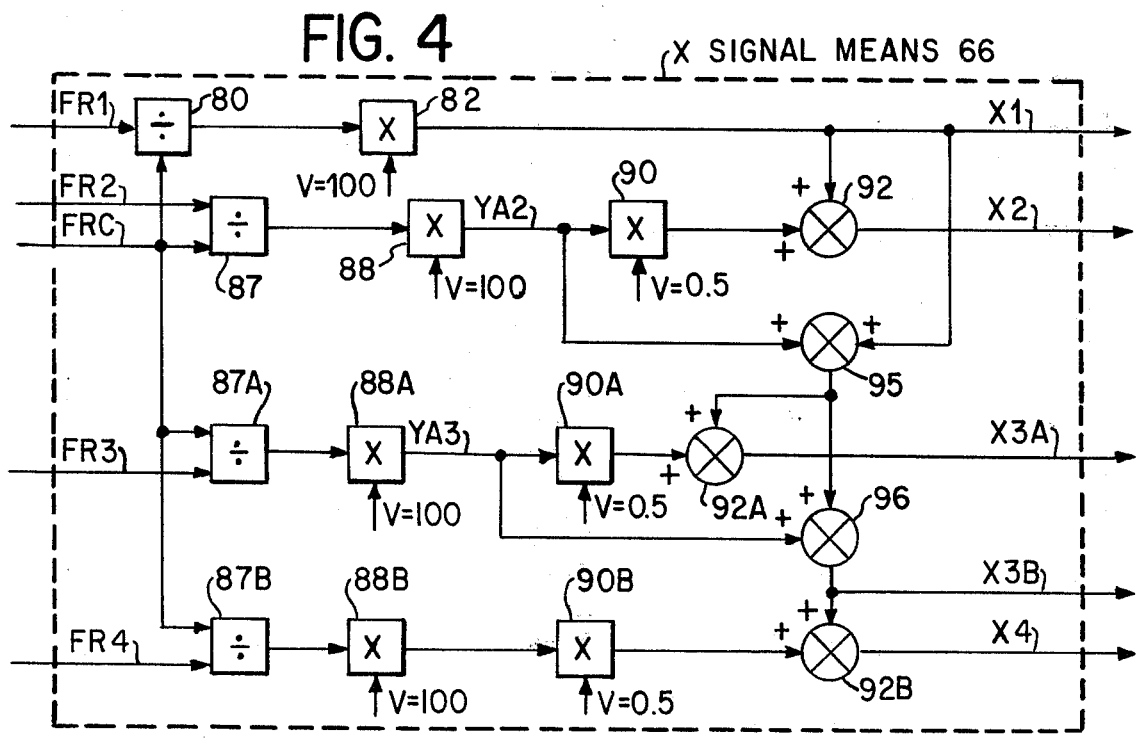
FIGS. 4, 5, 6 and 7 are detailed block diagrams of the x signal means, the BFB signal means, the AFB signal means and the $\sigma$FB signal means, respectively, shown in FIG. 3.

Referring now to FIG. 4, X signal means 66 includes a divider 80 dividing signal FR1 with signal FRC to provide a signal to a multiplier 82 where it is multiplied with a DC voltage corresponding to a value of 100. Multiplier 82 provides signal X1. A divider 87 divides signal FR2 with signal FRC to provide a signal to a multiplier 88 where it is multiplied with a direct current voltage corresponding to a value of 100. Multiplier 88 provides a product signal, correspondng to YA2, to another multiplier 90 where it is multiplied by a direct current voltage corresponding to the value of 0.5 to provide a product signal. Summing means 92 sums signal X1 with the signal from multiplier 90 to provide signal X2.

Summing means 95 sums signals X1 and YA2 to provide a sum signal to summing means 92A which cooperates with a divider 87A, and multipliers 88A and 90A to provide signal X3A using signals FR3 and FRC. Further, multiplier 88A provides signal YA3. Summing means 96 sums signal YA3 and the sum signal from summing means 95 to provide signal X3B. A divider 87B, receiving signals FRC and FR4, cooperates with multipliers 88B and 90B, receiving DC voltages correspondng to 100 and 0.5, respectively, and summing means 92B, receiving signal X3B, so that summing means 92B provides signal X4.

Figure 5:
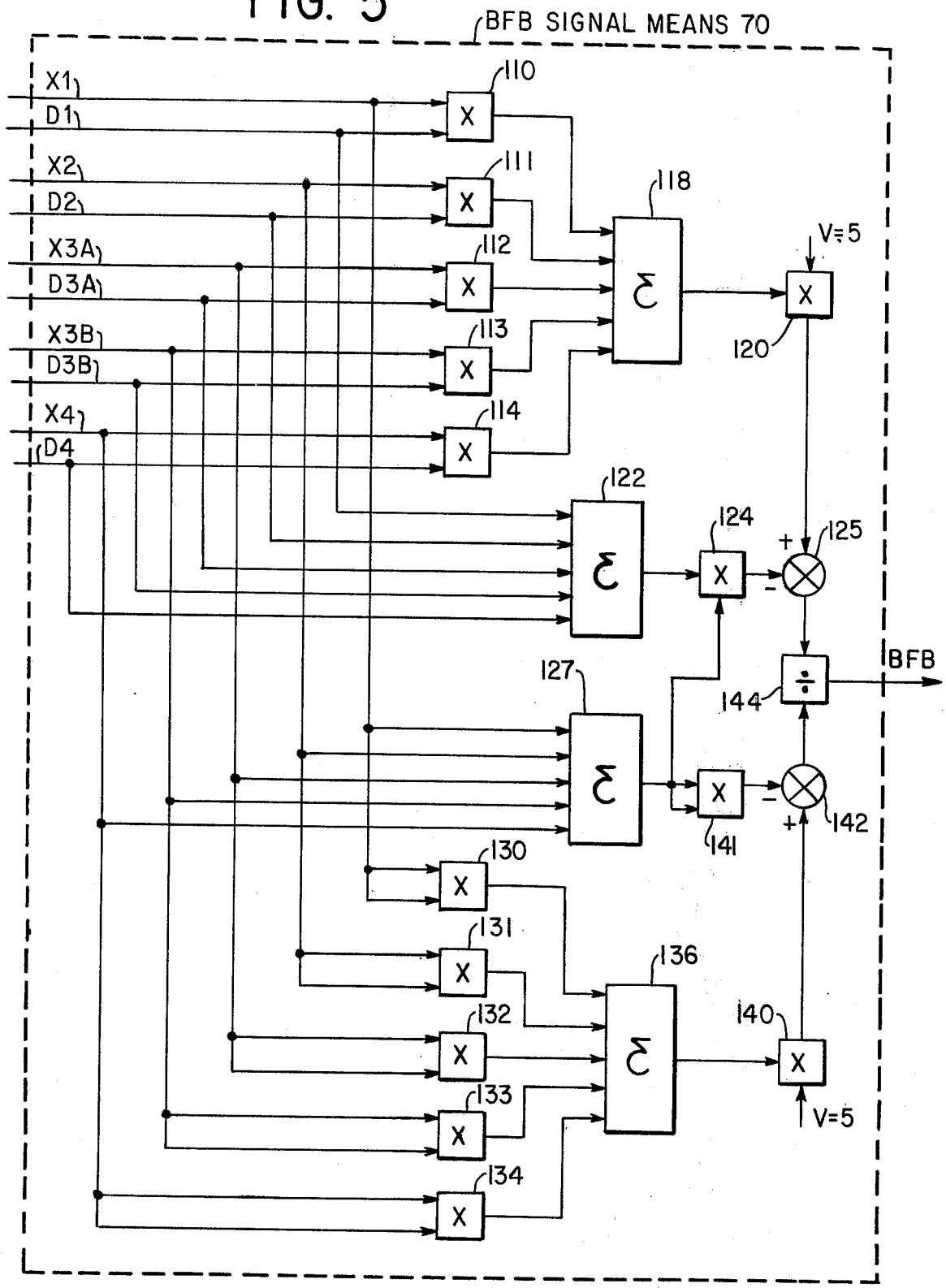

Referring now to FIG. 5, BFB signal means 70 includes multipliers 110, 111, 112, 113 and 114 multiplying signals X1, X2, X3A, X3B and X4, respectively, with signals D1, D2, D3, D3B and D4, respectively, to provide product signals to summing means 118. Summing means 118 provides a sum signal to a multiplier 120 where it is multiplied with a direct current voltage correspondng to the value of 5. Summing means 122 sum signals D1, D2, D3A, D3B and D4 to provide a sum signal which is multiplied with a sum signal provided by summing means 127, summing signals X1, X2, X3A, X3B and X4, by a multiplier 124 to provide a product signal. Subtraction means 125 subtracts the signal provided by multiplier 124 from the signal provided by multiplier 120. Multipliers 130 through 134 effectively square signals X1, X2, X3A, X3B and X4, respectively, to provide signals to summing means 136 where they are summed to provide a sum signal. Summing means 136 provides a sum signal to a multiplier 140 where it is multiplied with a direct current voltage corresponding to a value of 5 to provide a product signal. A multiplier 141 effectively squares the sum signal from summing means 127. Subtracting means 142 subtracts the produt signal provided by multiplier 141 from the product signal provided by multiplier 140. A divider 144 divides a signal provided by subtracting means 142 into the signal provided by subtracting means 125 to provide signal BFB.

Figure 6:
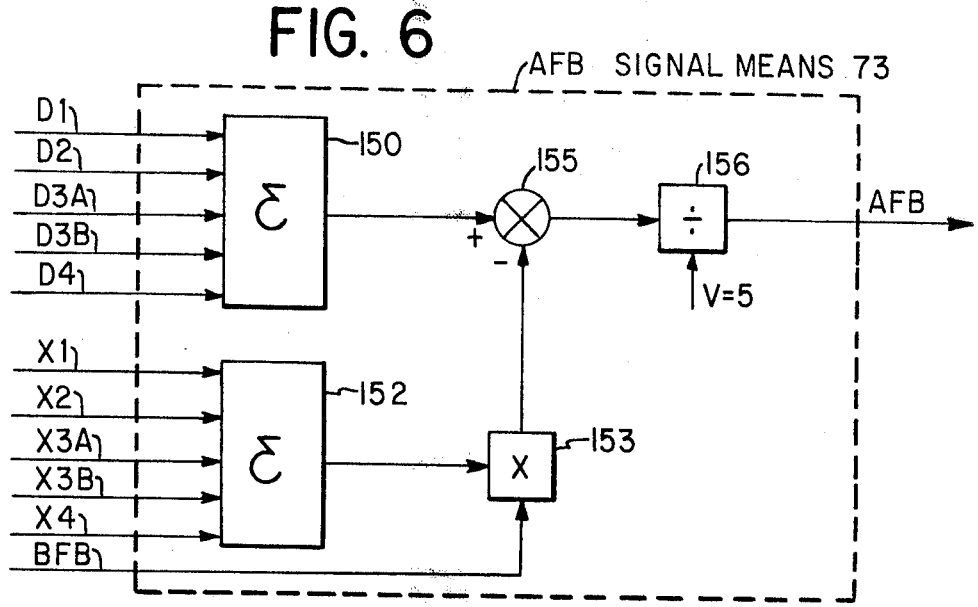

Referring now to FIG. 6, AFB signal means 73 includes summing means 150 summing signals D1, D2, D3A, D3B and D4 to provide a sum signal. Summing means 152 sums signal X1, X2, X3A, X3B and X4 to provide a sum signal to a multiplier 153 where it is multiplied with signal BFB to provide a product signal. Subtracting means 155 subtracts the signal provided by multiplier 153 from the sum signal provided by summing means 150 to provide a signal to a divider 156. Divider 156 divides a direct current voltage corresponding to a value of 5 into the signal from subtracting means 155 to provide signal AFB.

Figure 7:
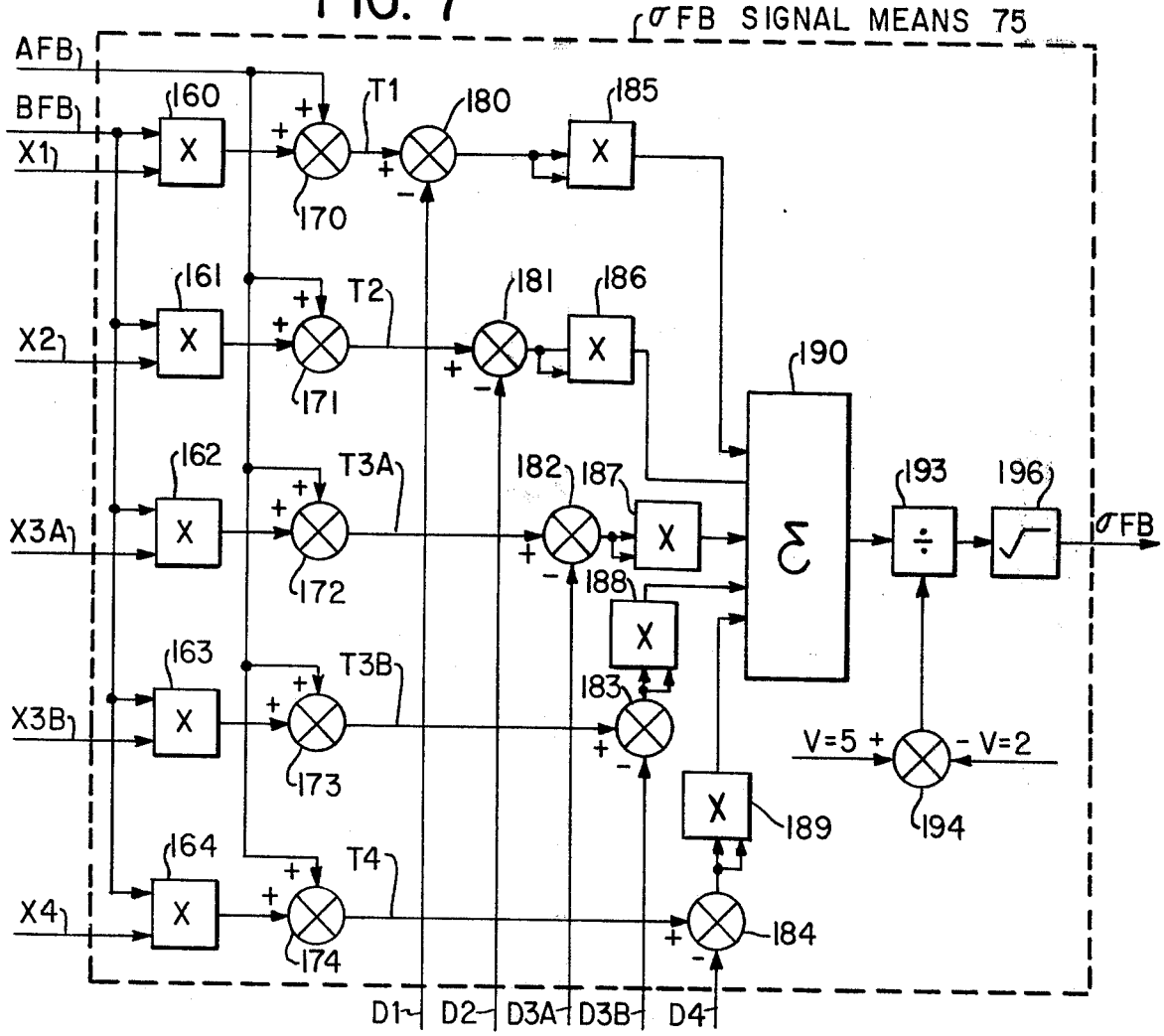

$\sigma$FB signal means 75, shown in FIG. 7, includes multipliers 160 through 164 multiplying signal BFB with signals X1, X2, X3A, X3B and X4, respectively to provide product signals to summing means 170 through 174, respectively, where they are summed with signal AFB. Summing means 170 through 174 provide signals T1, T2, T3A, T3B and T4, respectively, to subtracting means 180 through 184, respectively, where signals D1, D2, D3A, D3B and D4, respectively, are subtracted from them. Subtracting means 180 through 184 provide signals to multiplier means 185 through 189, respectively, which effectively square the signals. Summing means 190 sums the signals from multipliers 185 through 189 to provide a sum signal to a divider 193. Subtracting means 194 subtracts a direct current voltage corresponding to a value of 2 from a direct current voltage corresponding to a value of 5 to provide a signal to dividing means 193 which divides that signal into the signal from summing means 190 to provide a signal to a square root circuit 196. Circuit 196 provides signal $\sigma$FB.

Figure 8:
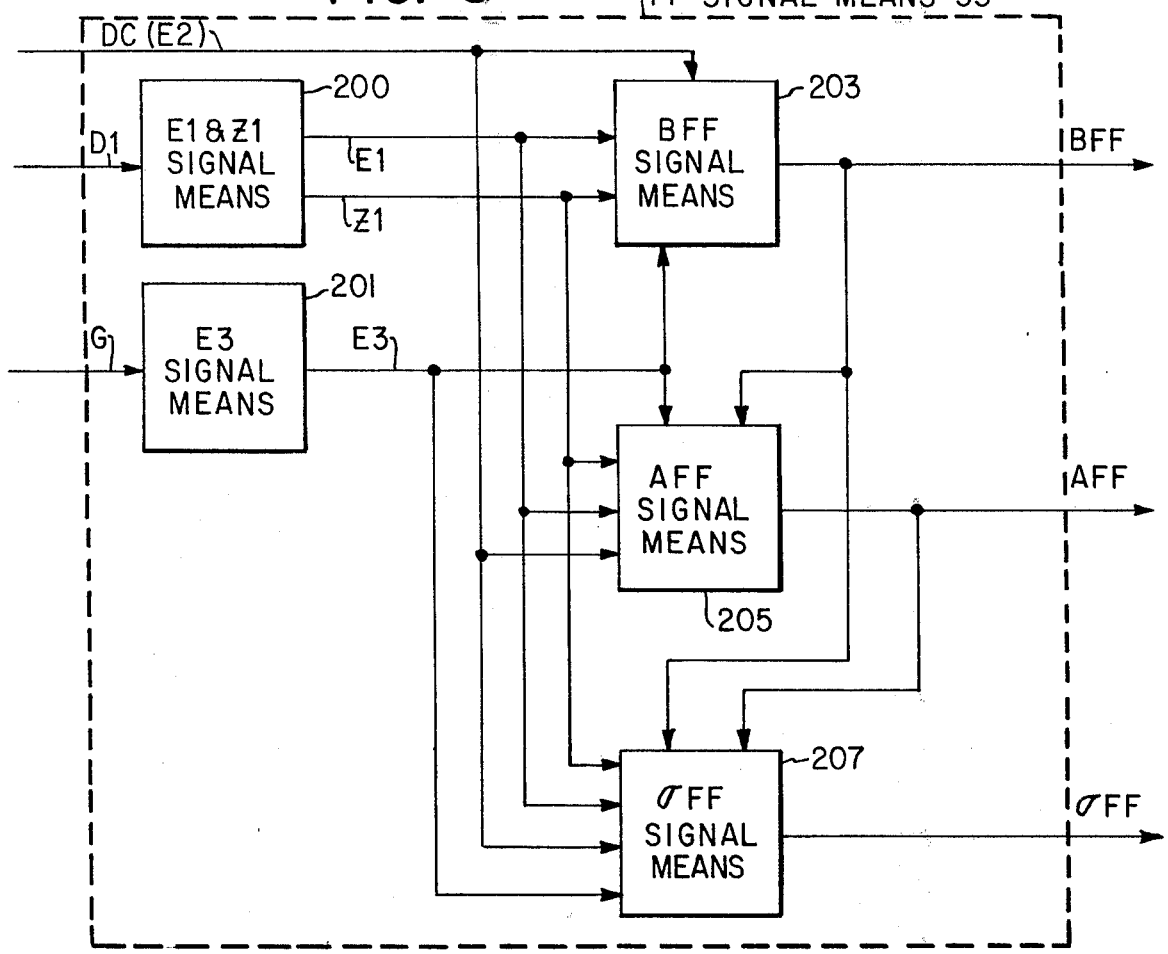

Referring now to FIG. 8, FF signal means 53 includes E1 & Z1 signal means 200, receiving signal D1 and providing signals E1 and Z1 as hereinafter explained.

E3 signal means 201 receives signal G and provides a signal E3 as hereinafter explained. BFF signal means 203 receives signals DC, E1, Z1 and E3 and provides signal BFF as hereinafter explained. AFF signal means 205 receives signals DC, E1, Z1, E3 and BFF and provides signal AFF as hereinafter explained. $\sigma$FF signal means 207 receives signals DC, E1, Z1, E3, BFF and AFF and provides signal $\sigma$FF as hereinafter explained.

Figure 9:
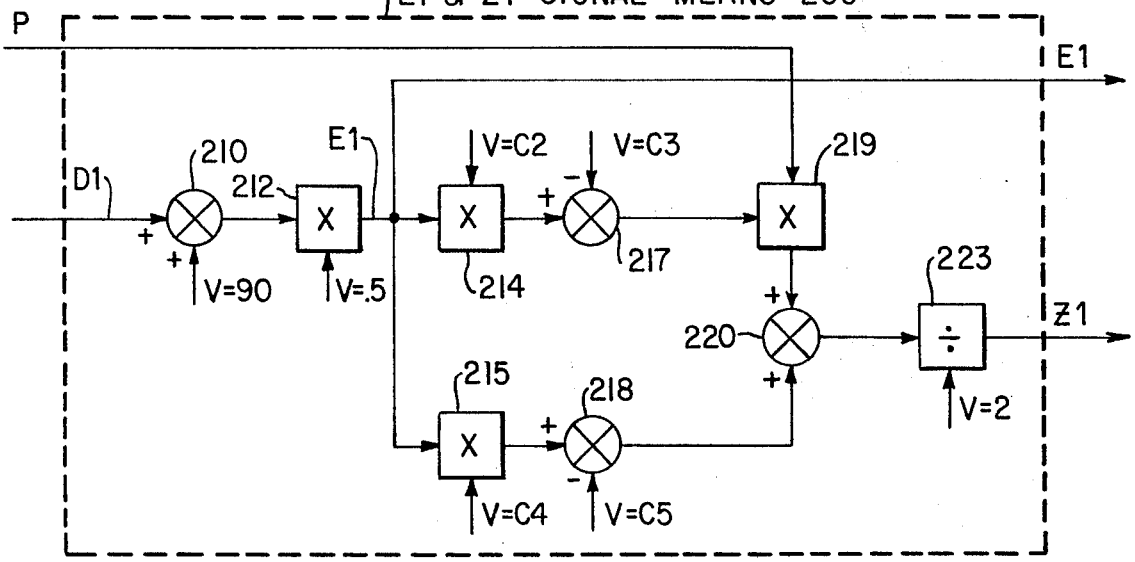
FIGS. 9, 10, 11, 12 and 13 are detailed block diagrams of the E1 & Z1 signal means, the E3 signal means, the BFF signal means, the AFF signal means and the $\sigma$FF signal means, respectively, shown in FIG. 8.

Summing means 210 in E1 and Z1 signal means 200, shown in FIG. 9, sums signal D1 with the DC voltage corresponding to a value of 90 to provide a sum signal to a multiplier 212 which multiplies it with a direct current voltage corresponding to the value of 0.5. Multiplier 212 provides signal E1 which is also provided to multipliers 214 and 215 which multiply it with DC voltages corresponding to constants C2 and C4, respectively, having preferred values of 0.0377 and 0.0715, respectively. Subtracting means 217, 218 subtract direct current voltages corresponding to constants C3 and C5, respectively, having preferred values of 4.48 and 7.2, respectively, from the signals provided by multipliers 214 and 215, respectively, to provide product signals. Multiplier 219 multiplies the signal from subtracting means 217 with signal P to provide a product signal. Summing means 220 sums the signals from subtracting means 218 and multiplier 219 to provide a sum signal. The sum signal provided by summing means 220 is divided by a direct current voltage corresponding to a value of 2 by a divider 223 to provide signal Z1.

Figure 10:
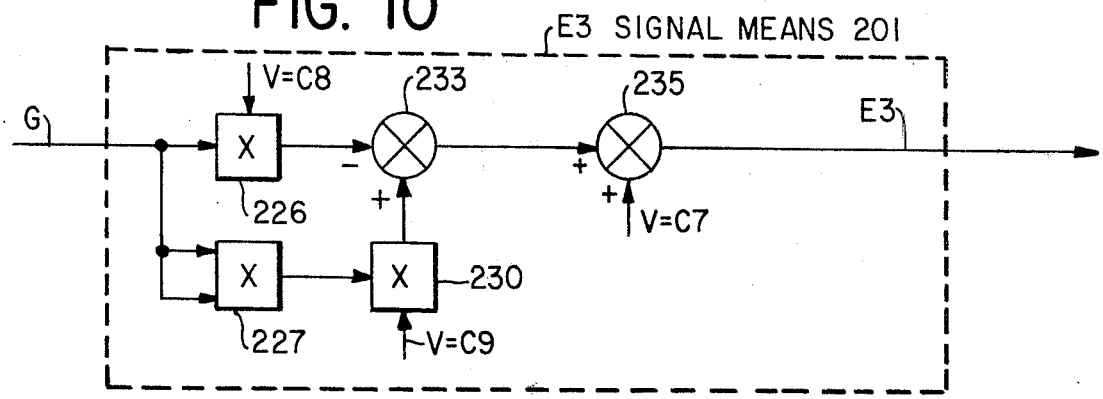

E3 signal means 201 shown in FIG. 10 includes a multiplier 226 multiplying signal G with a DC voltage, corresponding to a constant C8, having a preferred value of 21.6, while another multiplier 227 effectively squares signal G. Multiplier 230 multiplies a signal provided by multiplier 227 with a DC voltage, corresponding to a constant C9, having a preferred value of 0.06651, to provide a signal which has a product signal provided by multiplier 226 subtracting from it by subtracting means 233. Summing means 235 sums a DC voltage, corresponding to a constant C7 having a preferred value of 1215, with the difference signal provided by subtracting means 233 to provide signal E3.

Figure 11:
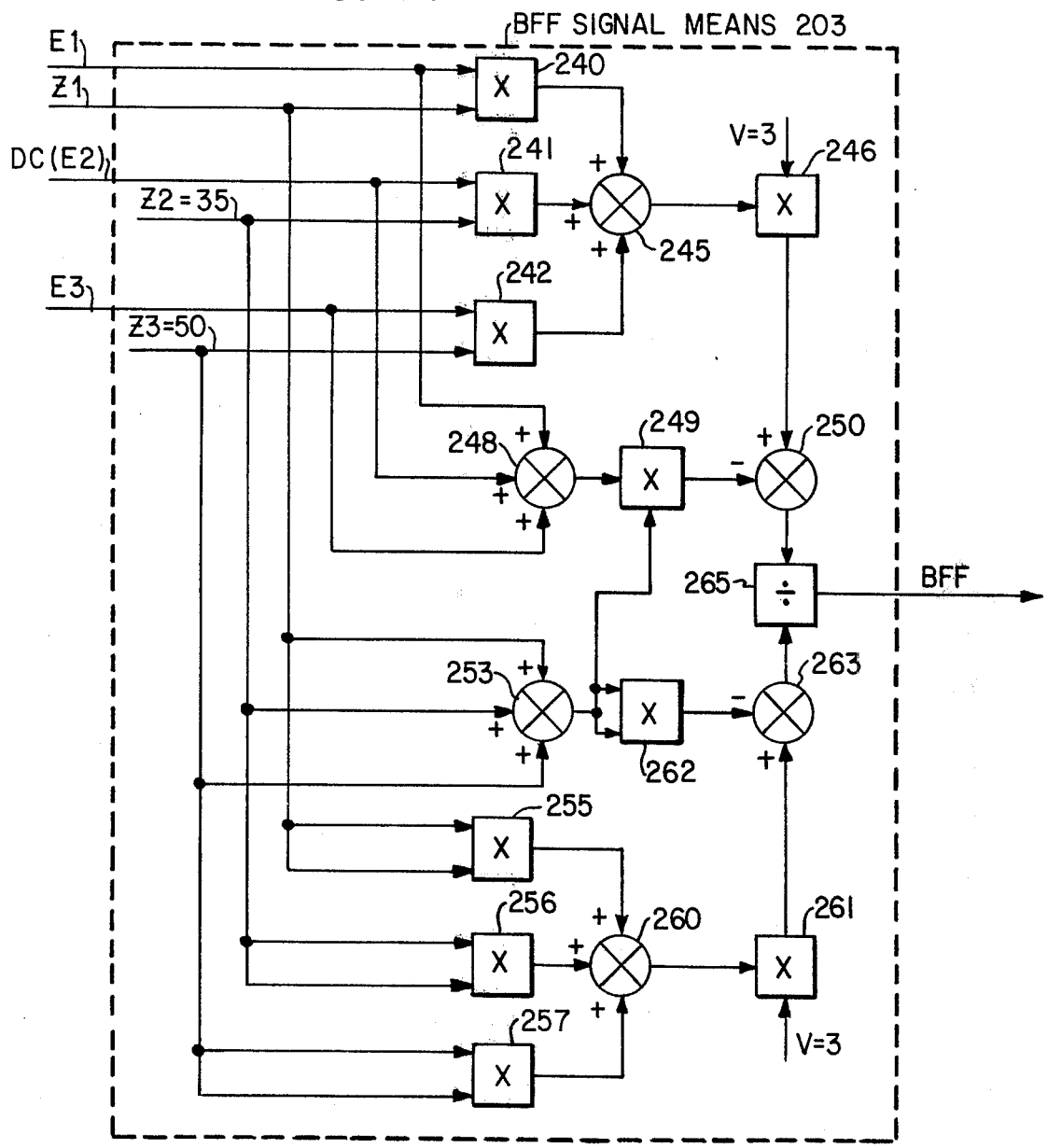

Referring to FIG. 11, BFF signal means 203 includes multipliers 240, 241 and 242 which multiply signals E1, DC and E3, respectively, with signals Z1, Z2 and Z3, respectively. In this sense, signal DC is utilized as signal E2 and Z2 and Z3 correspond to preferred values of 35 and 50, respectively. Summing means 245 sums the signals from multipliers 240, 241 and 242 to provide a sum signal to a multiplier 246 which multiplies it with a direct current voltage, corresponding to a value of 3, to provide a product signal. Summing means 248 sums signal E1, DC, E3 to provide a sum signal which is multiplied with a sum signal provided by summing means 253, summing signal Z1 and DC voltages Z2 and Z3, by a multiplier 249 to provide a product signal. Subtracting means 250 subtracts the signal provided by multiplier 249 from the signal provided by multiplier 246 to provide a corresponding signal. Multipliers 255, 256 and 257 effectively square signal Z1 and DC voltages Z2 and Z3, respectively, to provide signals to summing means 260 where they are summed. Summing means 260 provides a sum signal to a multiplier 261 where it is multiplied with a DC voltage corresponding to a value of 3. A multiplier 262 effectively squares the signal from summing means 253 to provide a signal. Subtracting means 263 subtracts the signal provided by multiplier 262 from the product signal provided by multiplier 261. A divider 265 divides the signal provided by subtracting means 263 into the signal provided by subtracting means 250 to provide signal BFF.

Figure 12:
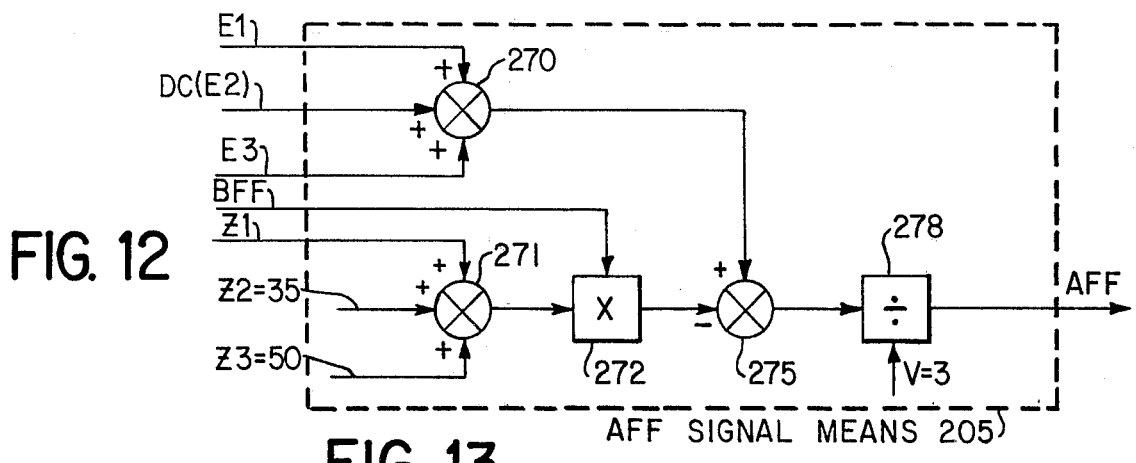

Summing means 270 in AFF signal means 205, shown in FIG. 12 sums signals E1 and E3 with signal DC to provide a sum signal. Summing means 271 sums signal Z1 with DC voltages Z2 and Z3 to provide a sum signal to a multiplier 272 where it is multiplied with signal BFF to provide a product signal. Subtracting means 275 subtracts the signal provided by multiplier 272 from the sum signal provided by summing means 270 to provide a signal to divider 278 where a direct DC voltage corresponding to a value of 3 is divided into it. Divider 278 provides signal AFF.

Figure 13:
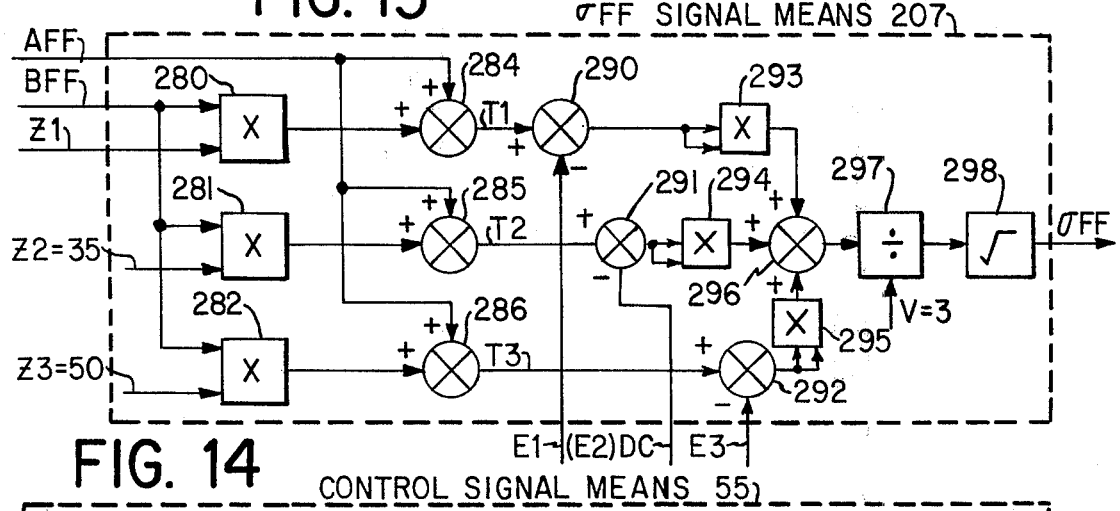

Referring now to FIG. 13, $\sigma$FF signal means 207 includes multipliers 280, 281 and 282, multiplying signal BFF with signals Z1 and DC voltages Z2 and Z3, respectively, to provide signals which are summed with signal AFF by summing means 284, 285 and 286, respectively. Summing means 284, 285 and 286 provide signals T1, T2 and T3, respectively, which have signals E1, DC and E3, respectively, subtracted from them by subtracting means 290, 291 and 292, respectively, to provide difference signals. Multipliers 293, 294 and 295, effectively square the signals provided by subtracting means 290, 291 and 292, respectively to provide signals which are summed by summing means 296. Summing means 296 provides a sum signal which has a DC voltage corresponding to a value of 3 divided into it by a divider 297. Divider 297 provides a signal to a square root circuit 298 which in turn provides signal $\sigma$FF.

Figure 14:
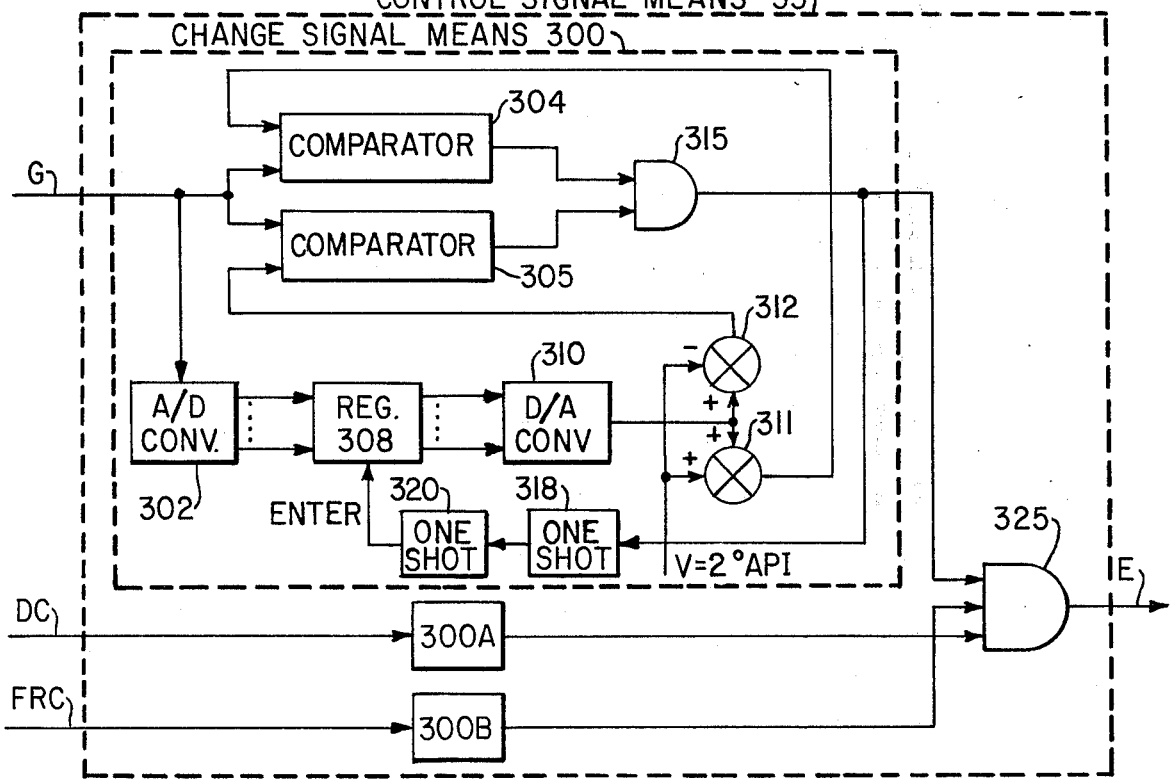

Referring now to FIG. 14, control signal means 55 includes change signal means 300 receiving signal G and providing a change signal. Signal G is applied to an analog-to-digital converter 302 and to comparators 304 and 305. Converter 302 provides digital signals, corresponding to G, to a register 308 which in turn provides digital signals corresponding to its stored content to a digital to analog converter 310. Digital to analog converter 310 provides an analog signal, corresponding to the stored signal G in register 308, to summing means 311 and subtraction means 312. Summing means 311 and subtraction means 312 receive a direct current change voltage corresponding to a predetermined change in API gravity, for example 2° API. Summing means 311 adds the change voltage to the signal from converter 310 to provide a reference signal, corresponding to an upper change limit for signal G, to comparator 304 while subtraction means 312 subtracts the change voltage from the signal from converter 310 to provide a reference signal, corresponding to a lower change limit for signal G, to comparator 305. As long as signal G is within the change limits, comparators 304 and 305 provide a high level output to an AND gate 315, which in turn provides a high level output to a one-shot multivibrator 318.

One-shot multivibrator 318 provides its output to another one-shot multivibrator 320 which in turn provides its output to control the entry of signals into register 308. In operation, as signal G changes by more than 2° API, the output of one of the comparators will go from a high logic level to a low logic level, thereby causing AND gate 315's output to change from a high logic level to a low logic level. The change from the high logic level to the low logic level triggers one-shot multivibrator 318, which provides a delay pulse, allowing the operation of signal generator 36 to occur before changing the contents of register 308. The trailing edge of the pulse provided by one-shot 318 triggers one-shot 320 to provide an 'enter' pulse to register 308 to up-date the contents of register 308 to the latest value of signal G. Change signal means 300A receives signal DC and operates similarly to provide its output along with the output from change signal means 300 to an AND gate 325. Similarly, change signal means 300B receives signal FRC to provide its output corresponding to a possible change in the flow rate of the crude oil to AND gate 325. The output of any change signal means of change signal means 300, 300A and 300B going to a low logic level causes signal E to go from a high logic level to a low logic level. AND gate 325 provides its output as signal E.

Figure 15:
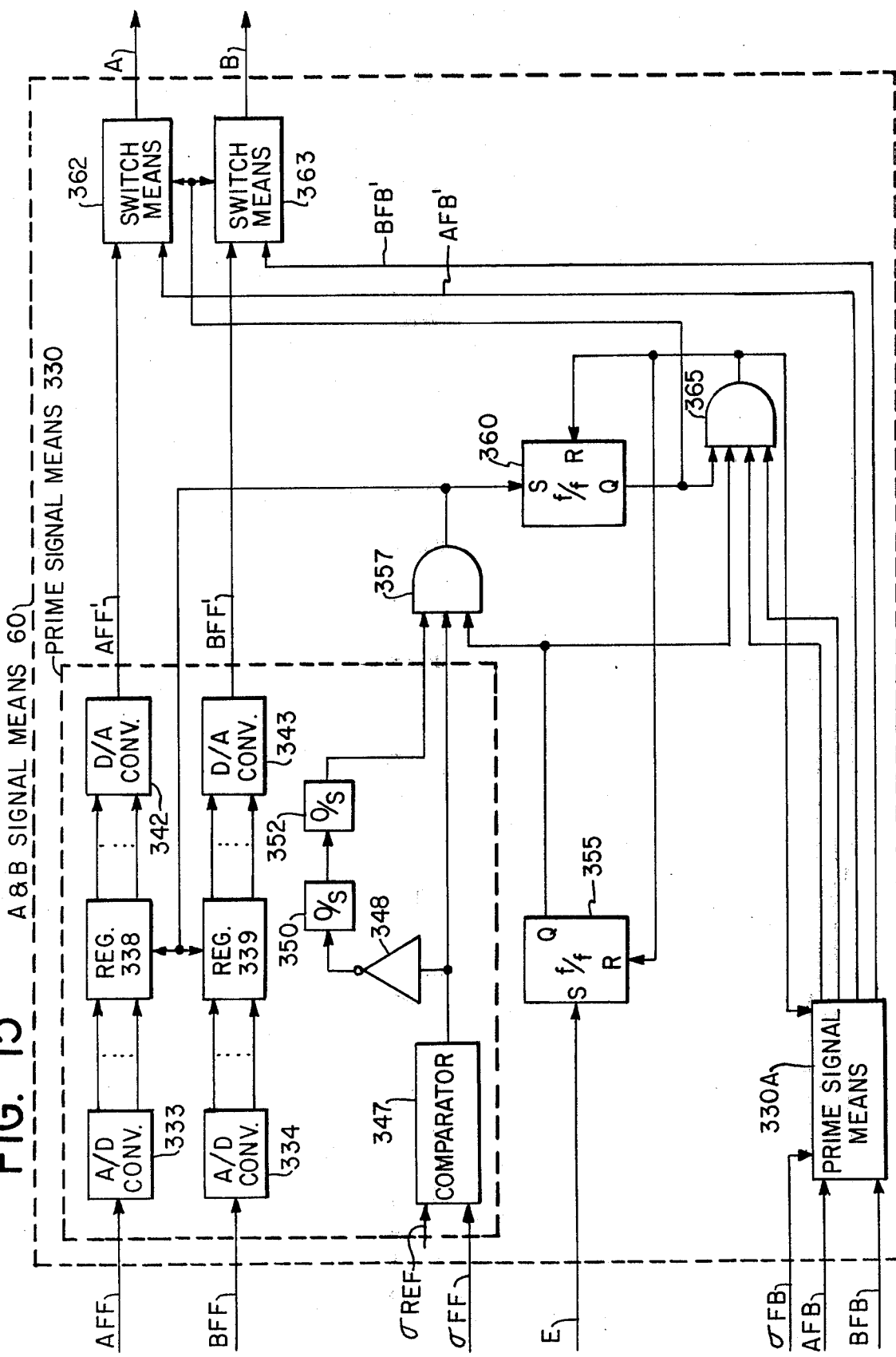

Referring now to FIG. 15, A and B signal means 60 includes prime signal means 330. Analog-to-digital converters 333, 334 in prime signal means 330 receive signals AFF and BFF, respectively, and provide digital signals corresponding to the received signals to registers 338 and 339, respectively. Registers 338 and 339 provide digital signals corresponding to their stored contents to digital-to-analog converters 342 and 343, respectively, which in turn provide signal AFF', BFF'. Signal $\sigma$FF is applied to a comparator 347 which receives a direct current voltage $\sigma$REF corresponding to a reference value for $\sigma$FF. By way of example, the reference value might be 0.6. The output from comparator 347 is applied to an inverter 348 which in turn provides its output to a one-shot multivibrator 350. The output from one-shot 350 is applied to another one-shot multivibrator 352.

A flip-flop 355 and an AND gate 357 operate in conjunction with prime signal means 330 as follows. Flip-flop 355 receives signal E at its set input and provides a Q output to AND gate 357. The Q output of a flip-flop is at a high logic level when the flip-flop is in a set state and at a low logic level when the flip-flop is in a clear state. In operation, when there is a change in either the gravity, the density or the flow rate of the crude oil, signal E goes to a low logic level triggering flip-flop 355 to a set state, thereby partially enabling AND gate 357 which receives the output from comparator 347 and one-shot 352. Initially, signal $\sigma$FF is greater than the $\sigma$ reference voltage and comparator 347 is at a low logic level. When signal $\sigma$FF is within its reference limit, comparator 347 provides its output at a high logic level, further enabling AND gate 357. The change to a high logic level triggers one-shot 350 which acts as a time delay before its trailing edge of its pulse triggers one-shot 352 to provide a pulse to AND gate 357. The pulse provided by AND gate 357 in response to the pulses from one-shot 352 causes registers 338 and 339 to enter their respective digital signals, thereby changing the values of signals AFF' and BFF'.

The pulse from AND gate 357 is provided to another flip-flop 360 triggering it to its set state. The Q output of flip-flop 360 is provided to switching means 362 and 363 receiving signals AFF' and BFF', respectively, causing switching means 362 to pass those signals. The Q output from flip-flop 360 is also provided to an AND gate 365 receiving the output from flip-flop 355 and signal from a one-shot, a comparator, corresponding to one-shot 352 and to comparator 347 in prime signal means 330A. Prime signal means 330 receives signals, AFB, BFB, and FB and provides signals AFB' and BFB' to switching means 362 and 363, respectively.

As the system stabilizes and the feedback data become more meaningful, 330A provides a high logic level signal to AND gate 365 and a pulse to AND gate 365. The pulse passes through AND gate 365 and resets flip-flops 355 and 360 to cause the new data to be entered into registers in prime signal means 330A. With the output of flip-flop 360 at a low logic level switching means 362 and 363 provide AFB', BFB' as signals A and B, respectively.

Figure 16:
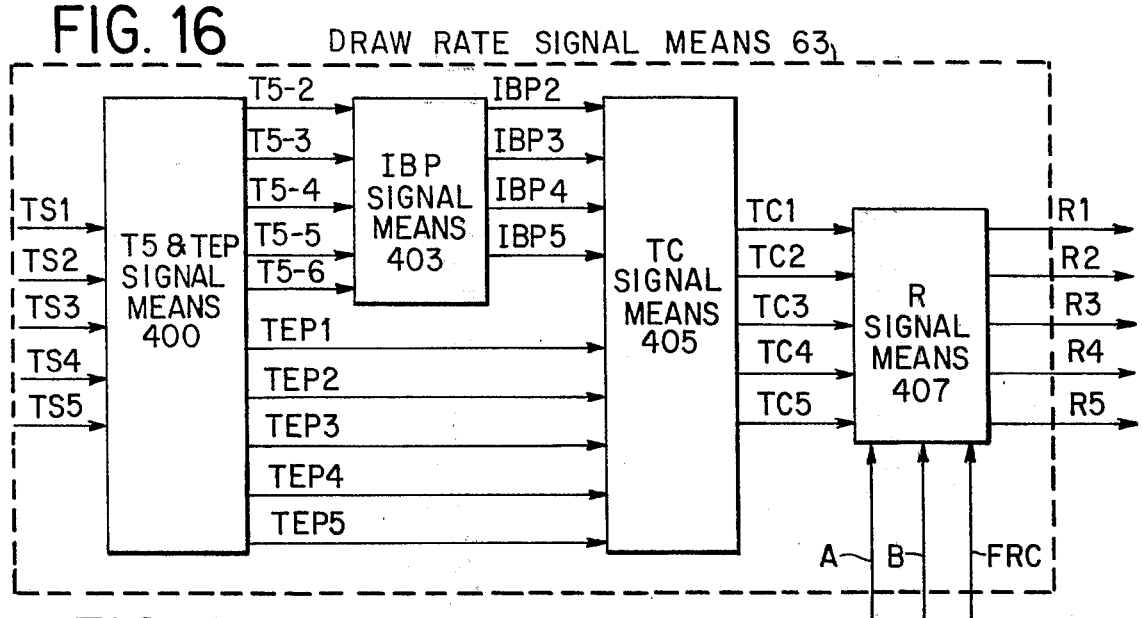

Draw rate signal means 63 shown in FIG. 16 includes T5 & TEP signal means 400 receiving DC voltages TS1, TS2, TS3, TS4 and TS5. The TS voltages are operator controlled and correspond to different ASTM end point specifications for product streams Nos. 1 through 5. Signal means 400 provides signals TEP1 through TEP5 to TC signal means 405 receiving signals IBP2 through IBP5 from signal means 403 as hereinafter explained. TC signal means 405 provides signals TC1 through TC5 to R signal means 407 which also receives signals A, B and FRC. R signal means 407 provides signals R1 through R5 as hereinafter explained.

Figure 17:
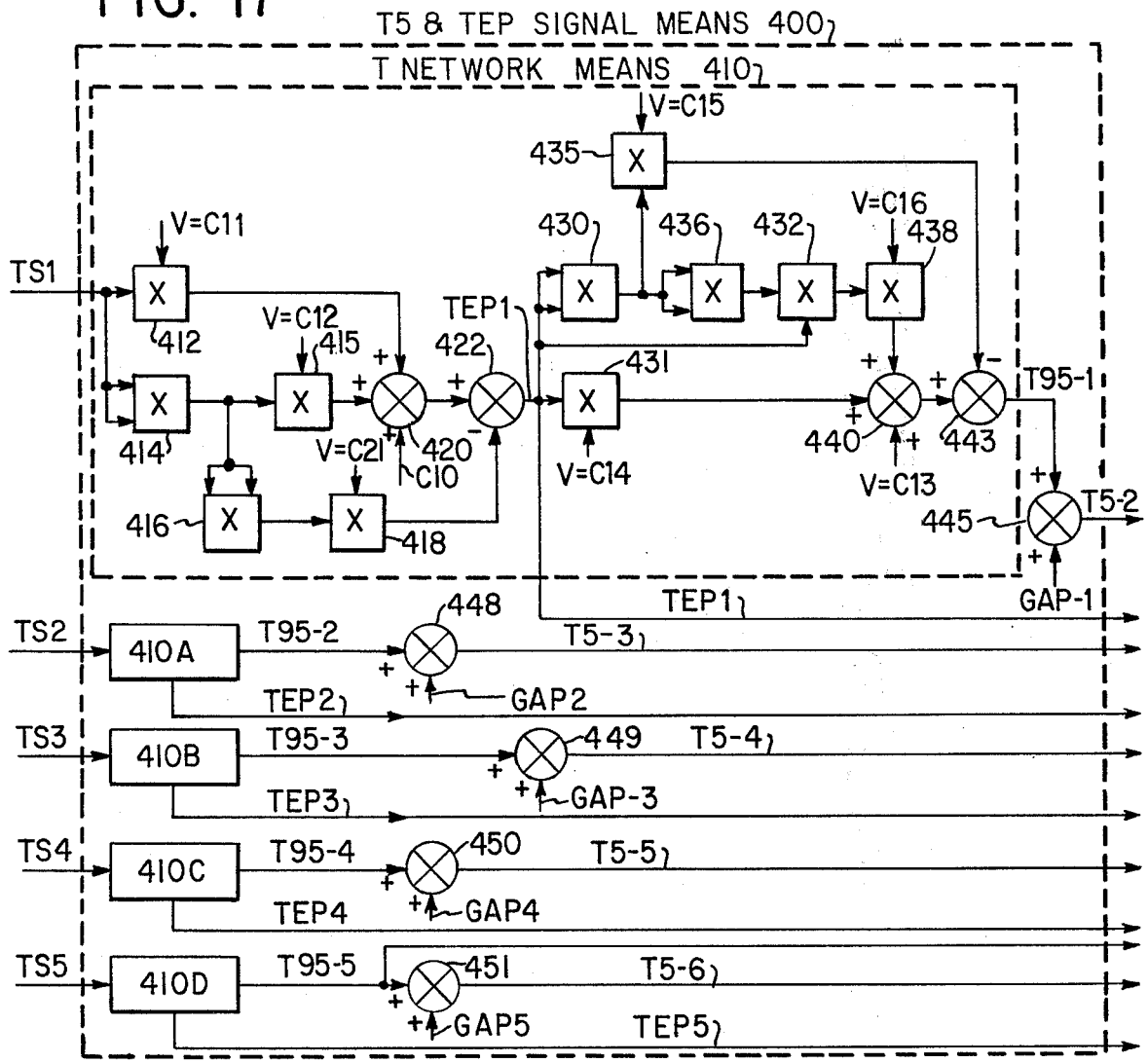

Referring now to FIG. 17, T5 & TEP signal means 400 includes T network means 410 receiving DC voltage TS1. Voltage TS1 is provided to multipliers 412 and 414 where it is multiplied with another direct current voltage C11 corresponding to the constant C11 of equation 22 and which effectively squares voltage TS1, respectively. The product signal from multiplier 414 is provided to multipliers 415 and 416. Multiplier 415 multiplies the product signal from multiplier 414 with a DC voltage corresponding to the constant C12 in equation 22, which multiplier 416 effectively squares the signal from multiplier 414 to provide a product signal to another multiplier 418. Multiplier 418 multiplies the signal from multiplier 416 with a direct current voltage corresponding to the constant C21. Summing means 420 sums the signals from multipliers 412 and 415 with a DC voltage corresponding to the constant C10 to provide a sum signal to subtracting means 422. Subtracting means 422 subtracts the signal provided by multiplier 418 from the sum signal provided by summing means 420 to provide signal TEP1 corresponding to the end point temperature of stream 1.

Signal TEP1 is provided to multipliers 430, 431 and 432. Multiplier 430 effectively squares signal TEP1 and provides it to multipliers 435 and 436. Multiplier 436 effectively squares the signal from multiplier 430 and provides it to multiplier 432 where it is multiplied with signal TEP1 to provide a product signal to another multiplier 438. Multiplier 438 multiplies the signal from multiplier 432 with a DC voltage corresponding to a constant C16 having preferred values of $0.66230529 \times 10^{-13}$. Multiplier 431 multiplies signal TEP1 with a DC voltage corresponding to a constant C14, having a preferred value of 1.224821, to provide a signal which is summed with the signal from multiplier 438 and with another DC voltage corresponding to a constant C13, having a preferred value of $-67.90656$, by summing means 440. Multiplier 435 multiplies the signal from multiplier 430 with a DC voltage corresponding to a constant C15 having a preferred value of $0.31855362 \times 10^{-3}$. Subtracting means 443 subtracts the product signal provided by multiplier 435 from the sum signal provided by summing means 440 to provide a signal corresponding to the 95% temperature point for stream No. 1. Summing means 445 sums the signal from subtracting means 443 with a DC voltage GAP 1 corresponding to the gap between the stream No. 1 and stream No. 2 as determined by experience. Summing means 445 provides signal T5-2.

Similarly, T network means 410A, 410B, 410C, 410D receive voltages TS2 through TS5 and provides signals TEP2 through TEP5. T network means 410A, 410B, 410C and 410D also provides signals corresponding to the 95% temperature to summing means 448, 449, 450 and 451, respectively, where they are summed with DC voltages GAP-2, GAP-3, GAP-4 and GAP-5, corresponding to the gaps between the streams Nos. 2 and 3, streams Nos. 3 and 4, and streams Nos. 4 and 5, and streams Nos. 5 and 6, respectively. It is noted that stream No. 6 is an assumed stream and is not produced by the unit.

Figure 18:
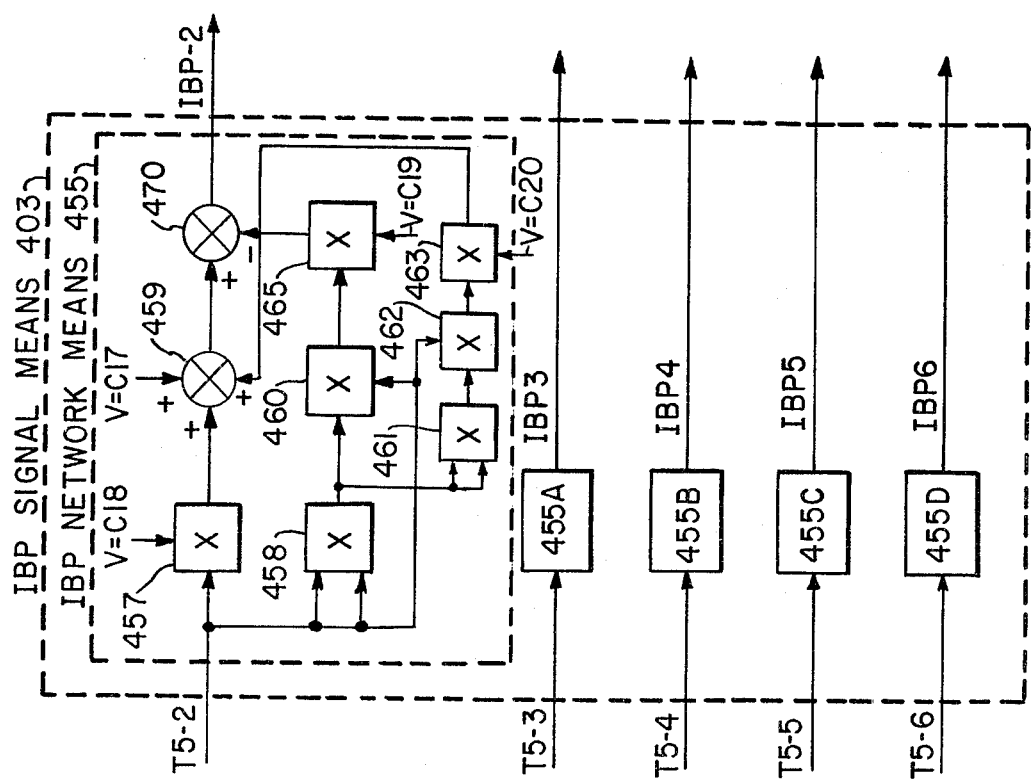

IBP signal means 403 includes IBP network means 455 as shown in FIG. 18. In IBP network means 455, multipliers 457 and 458 multiply signal T5-2 with a DC voltage, corresponding to the constant C18 in equation 25 and effectively squares signal T5-2, respectively, to provide signals to summing means 459 and a multiplier 460, respectively. A multiplier 461 again squares the signal from multiplier 458 to provide a signal which is multiplied with signal T5-2 by a multiplier 462 to provide a signal corresponding to $(T5-2)^5$. The signal from multiplier 462 is multiplied with a DC voltage corresponding to the constant C20 by a multiplier 463 to provide a signal to summing means 459. Summing means 459 sums a DC voltage, corresponding to the constant C17 with the received signals. Multiplier 460 multiplies the signal from multiplier 458 with signal T5-2 to effectively cube signal T5-2. Multiplier 465 multiplies the signal from multiplier 460 with a DC voltage, corresponding to the constant C19 to provide a signal which is subtracted from the signal provided by summing means 459 by subtracting means 470. Subtracting means 470 provides signal IBP-2. Similarly, IBP network means 455A, 455B and 455C receive signals T5-3, T5-4 and T5-5, respectively, and provides signals IBP-3, IBP-4 and IBP-5, respectively.

Figure 19:
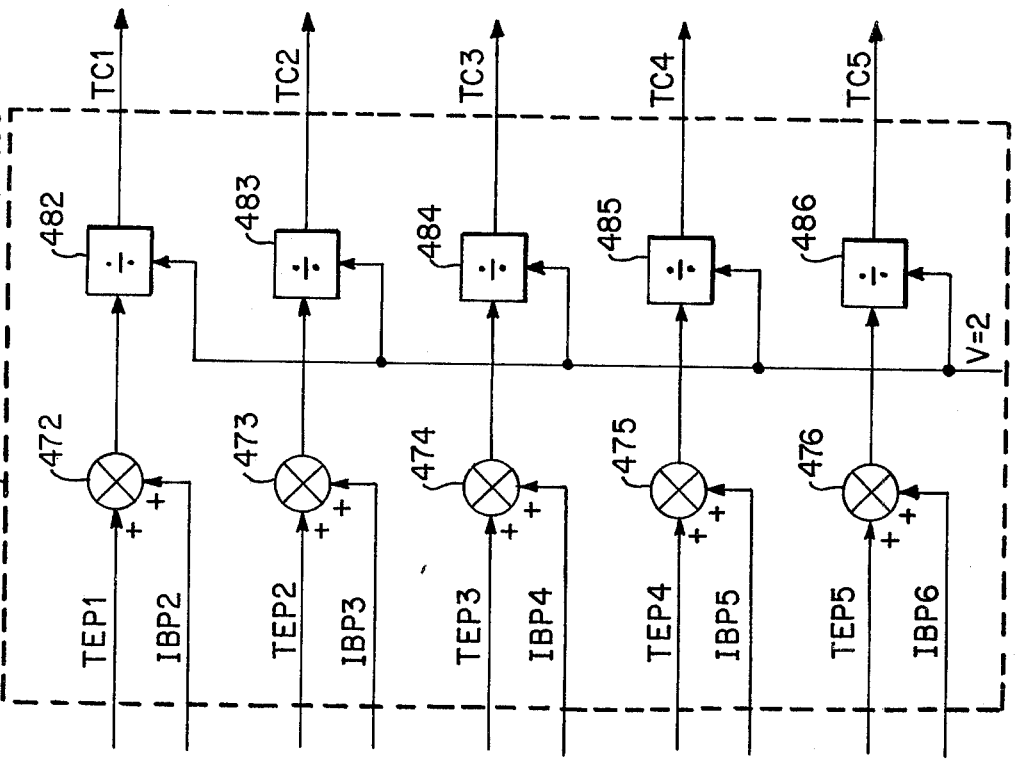

Referring now to FIG. 19, TC signal means 405 includes summing means 472 through 476, summing signals TEP1 and IBP2, TEP2 and IBP3, TEP3 and IBP4, TEP4 and IBP5, and TEP5 and IBP6, respectively. Dividers 482 through 486 divide a DC voltage, corresponding to a value of 2, into the sum signals from summing means 472 through 476 to provide signal TC1 through TC5, respectively.

Referring now to FIG. 20, R signal means 406 includes YC network 500 having subtraction means 501 subtracting signal A from signal TC1 to provide a signal which is divided by signal B by a divider 503. Divider 503 provides a YC signal, however, since YC1 is equal to YT1 it is shown as signal YT1 in the drawing. Similarly YC networks 500A, 500B, 500C and 500D utilize signals A and B with signals TC2, TC3, TC4 and TC5, respectively, to provide signals YC2, YC3, YC4 and YC5, respectively. Subtracting means 505 through 508 subtract signals YT1, YC2, YC3 and YC4 from signals YC2, YC3, YC4 and YC5, respectively. Multipliers 510 through 514 multiply signals YT1 through YT5 with signal FRC to provide signals R1 through R5, respectively.

The present invention as hereinbefore described is a draw rate signal generator for generating signals corresponding to draw rates for an atmospheric crude distillation unit.

What is claimed is:

1. A draw rate signal generator for an atmospheric crude distillation unit receiving crude oil and providing removed product streams 1 through 5 and a reduced crude oil comprises flow rate sensing means for sensing the flow rates of the crude oil and of streams 1 through 4 and providing signals FRC, FR1, FR2, FR3 and FR4, respectively, corresponding thereto; analyzing means for sampling the crude oil entering the distillation unit and providing signals DC, G and P corresponding to the 35% point temperature, the API gravity and the vapor pressure of the crude oil; end point analyzer means sampling streams Nos. 1 and 3 and providing signals D1 and D3B, respectively, corresponding to the end points temperatures of streams Nos. 1 and 3, respectively; 50% point analyzer means sampling streams 2, 3 and 4 and providing signals D2, D3A and D4, respectively, corresponding to the 50% point temperatures of streams Nos. 2, 3 and 4, respectively; and draw rate signal means connected to the flow rate sensing means, to the crude analyzing means, to the end point analyzing means and to the 50% point analyzing means for providing signals R1 through R5 corresponding to the draw rate for streams Nos. 1 through 5, in accordance with signals from the sensing means and all the analyzing means.

2. A signal generator as described in claim 1 in which the draw rate signal means includes feedback signal means connected to the end point analyzer means, to the 50% point analyzer means and to the flow rate sensing means and providing signals AFB, BFB and $\sigma$FB corresponding to the intercept, to the slope and to the standard error of estimate of a feedback distillation curve in accordance with signals D1, D2, D3A, D3B, D4, FRC, FR1, FR2, FR3 and FR4; feed forward signal means connected to the end point analyzer means and to the crude analyzer means for providing signals AFF, BFF and $\sigma$FF corresponding to the intercept, to the slope and to the standard error of estimate of a feed-forward distillation curve in accordance with signals DC, D1 and G, respectively; control signal means connected to the crude analyzing means and to the flow rate sensing means for providing a control signal E in accordance with signals DC, G, and FRC; A & B signal means connected to the FB signal means, to the FF signal means and to the control signal means for providing either signals AFB and BFB or signals AFF and BFF as signals A and B in accordance with signals $\sigma$FB, $\sigma$FF and E; and draw rate network means connected to the A & B signal means and to the flow rate sensing means for providing draw rate signals R1 through R5 in accordance with signals A, B and FRC.

3. A signal generator as described in claim 2 in which the FB signal means includes X signal means connected to the flow rate sensing means for providing signals X1, X2, X3A, X3B and X4, corresponding to the cummulative yields at the end point of cut 1, at the 50% point of cut 2, at the 50% point of cut 3, at the end point of cut 3 and at the 50% point of cut 4, respectively; BFB signal means connected to the X signal means, to the end point analyzer means and to the 50% point analyzer means for providing signal BFB in accordance with signals X1, X2, X3A, X3B, X4, D1, D2, D3A, D3B and D4; AFB signal means connected to the X signal means, to the end point analyzer means, to the 50% point analyzer means and to the DFB signal means for providing signal AFB in accordance with signals X1, X2, X3A, X3B, X4, D1, D2, D3A, D3B, D4 and BFF; and $\sigma$FB signal means connected to the X signal means, to the 50% point analyzer means, to the end point analyzer means, to the BFB signal means and to the AFB signal means for providing signal $\sigma$FB in accordance with signals X1, X2, X3A, X3B, X4, D1, D2, D3A, D3B & D4, AFB and BFb.

4. A signal generator as described in claim 3 in which the FF signal means includes E1 & Z1 signal means connected to the end point analyzer means for providing signals E1 and Z1, corresponding to the 50% point and to estimated yield at 50% point for stream No. 1, in accordance with signal D1; E3 signal means connected to the crude analyzer means for providing signal E3, corresponding to the 50% point of the crude, in accordance with signal G; BFF signal means connected to the crude analyzer means and to the E1 & Z1 signal means for providing signal BFF in accordance with signals DC, E1 and Z1, AFF signal means connected to the crude analyzer means, to the E1 & Z1 signal means, to the E3 signal means and to the BFF signal means for providing signal AFF in accordance with signals E1, E3, Z1, DC and BFF; $\sigma$FF signal means connected to the E1 & Z1 signal means, to the crude analyzer means, to the E3 signal means, to the BFF signal means and to the AFF signal means for providing signal $\sigma$FF in accordance with signals DC, E1, E3, Z1, BFF and AFF.

5. A signal generator as described in claim 4 in which the control signal means include a first change signal means connected to the crude analyzer means for providing a signal at one logic level when signal G has changed by a first predetermined amount and at another logic level when signal G has not changed by the first predetermined amount; second change signal means connected to the crude analyzer means for providing a signal at one logic level when signal DC has changed by a second predetermined amount and at another logic level when signal DC has not changed by the second predetermined amount; third change signal means connected to the flow rate sensing means for providing a signal at one logic level when signal FRC has changed by a third predetermined amount and at another logic level when signal FRC has not changed by the third determined amount; and a first AND gate connected to the three change signal means providing signal E1 at the one logic level when the signal from all the change means at at the one logic level and at another logic level when at least one signal from any of the change signal means is at a low logic level.

6. A signal generator as described in claim 5 in which the A & B signal means include first prime signal means connected to the AFF signal means, to the BFF signal means and to the $\sigma$FF signal means for providing signals AFF' and BFF' corresponding to signals AFF and BFF, respectively, when the standard deviation of the feedforward curve is less than a fourth predetermined value; second prime signal means connected to the AFB signal means, to the BFB signal means and to the $\sigma$FB signal means for providing signals AFB' and BFB' corresponding to signals AFB and BFB when the standard deviation for the feedback curve is less than a fifth predetermined value, and switching means connected to the AND gate and to the first and second prime signal means for being responsive to signal E1 and the control signals from the first and second prime signal means to provide signal AFB' and BFB' as signals A and B until a change in either the crude oil gravity, 35% point of flow rate has occurred and the standard deviation of the feed forward curve is greater than than or equal to the fourth predetermined value, providing signals AFF' and BFF' as signals A and B when a change in crude oil gravity, 35% point or flow rate has occurred and the standard deviation of the feed forward curve is less than the fourth predetermined value, and for providing signals AFB' and BFB' as signals A and B after signals AFF' and BFF' have been provided as signals A and B and the standard deviation for the feedback curve is less than the fifth predetermined value.

7. A signal generator as described in claim 6 in which the X signal means also receives direct current voltages corresponding to 100 and to 0.5 and provides signals X1, X2, X3A, X3B and X4 in accordance with the following equations:

$$X1 = YA1 = (FR1)(100)/(FRC),$$

$$YA2 = (FR2)(100)/(FRC),$$

$$X2 = YA1 + (0.5)(YA2),$$

$$YA3 = (FR3)(100)/(FRC),$$

$$X3A = YA1 + YA2 + (0.5)(YA3),$$

$$Y3B = YA1 + YA2 + YA3,$$

$$YA4 = (FR4)(100)/(FRC), \text{ and}$$

$$X4 = YA1 + YA2 + (0.5)(YA4),$$

where YA1 through YA4 are the actual percentage yields of cuts 1 through 4.

8. A signal generator as described in claim 7 in which the BFB signal means also receives a direct current voltage corresponding to a value of 5 and provides signals BFB in accordance with the received signals and the direct current voltage and the following equation:

$$BFB = [5\epsilon(XnDn) - (\epsilon Xn)(\epsilon Dn)]/[5\epsilon(Xn)^2) - (\epsilon Xn)^2],$$

where Dn is either the end point or the 50% point temperature for stream n and Xn is the cummulative yield for stream n at either the end point or 50% point temperature.

9. A signal generator as described in claim 8 in which the AFB signal means also receives the direct current voltage corresponding to a value of 5, and provides signals AFB in accordance with received signals and the DC voltage and the following equation:

$$AFB = [\epsilon Dn - (BFB)(\epsilon Xn)]/(5).$$

10. A signal generator as described in claim 9 in which the FB signal means receives direct current voltages corresponding to values of 2 and 5 and provides signal FB in accordance with the received signals, the direct current voltages and the following equations:

$$TnFB = AFB + (BFB)(Xn),$$

$$\Delta nFB = TnFB - Dn, \text{ and}$$

$$\sigma Fb = \sqrt{\epsilon(\Delta nFF)^2/(5-2)}$$

where TnFB is the temperature of point Xn on the feedback distillation curve for the crude.

11. A signal generator as described in claim 10 in which E1 & Z1 signal means also receives direct current voltages corresponding to values of 90 and 0.5 and constants C2, C3, C4 and C5 and 2 and provides signals E1 and Z1 in accordance with received signals and received direct current voltages and the following equations:

$$E1 = (0.5)(90 + D1), \text{ and}$$

$$Z1 = \{[(C2)(E1) - (C3)]P + [(C4)(E1) - (C5)]\}/2.$$

12. A signal generator as described in claim 11 in which the E3 signal means also receives direct current voltages corresponding to constants C7, C8 and C9 and provides E3 in accordance with the received signal G, the received DC voltages and the following equation:

$$E3 = C731\,(C8)(G) + (C9)(G)^2.$$

13. A signal generator as described in claim 12 in which the BFF signal means also received direct current voltages Z2 and Z3 and a direct current voltage corresponding to a value of 3 and provides signals BFF in accordance with the received signals, the received DC voltages and the following equation:

$$BFF = [(3)(\epsilon EnZn) - (\epsilon En)(\epsilon Zn)]/[3\epsilon(Zn)^2 - (\epsilon Zn)^2].$$

14. A signal generator as described in claim 13, in which the AFF signal means also receives DC voltages Z2 and Z3 and a DC voltage corresponding to a value of 3 and provides signal AFF in accordance with the received signals, the received DC voltages and the following equation:

$$AFF = [\epsilon En - (BFF)(\epsilon Zn)]/3.$$

15. A signal generator as described in claim 14 in which the $\sigma FF$ signal means receives direct current voltages Z2 and Z3, and a DC voltage corresponding to the value of 3 and provides signals $\sigma FF$ in accordance with the received signals and the received DC voltages and the following equations:

$$TnFF = AFF + (BFF)(Zn),$$

$$\Delta nFF = TnFF - En, \text{ and}$$

$$FF = \sqrt{\epsilon(\Delta nFF)^2}.$$

16. A signal generator as described in claim 15 in which each prime signal means includes a pair of analog-to-digital converters, one analog-to-digital converter receiving either signal AFF or signal AFB and providing digital signals corresponding thereto, the other analog-to-digital converter receiving either signal BFF or signal BFB and providing corresponding digital signals; a pair of registers, each register being connected to a corresponding analog-to-digital converter for entering the digital signals from the corresponding converter in response to a pulse and providing digital signals corresponding to its contents; a pair of digital-to-analog converters connected to corresponding registers, one converter providing either signal AFF' or AFB' in accordance with the digitals from a corresponding register, the other converter providing either signal BFF' or BFB' in accordance with the digital signals from its corresponding register; a comparator receiving either signal $\sigma FF$ or $\sigma FB$ and a reference signal corresponding to a standard error of estimate limit for either the feedforward curve or feedback curve and connected to the switching means provides a signal to the switching means at one amplitude when the received signal is equal to or greater than the reference signal and at another amplitude when the received signal is less than the reference signal; and pulse means connected to the comparator and to the switching means for providing a pulse to the switching means when the signal from the comparator changes from the other amplitude to the one amplitude; and the switching means provides enter pulse to the registers in a prime signal means when the standard deviation signal received by the prime signal means is less than its corresponding reference signal.

17. A signal generator as described in claim 16 in which the draw rate signal means includes T5 & TEP signal means receiving DC voltages TS1 through TS5 corresponding to ASTM end point specifications for streams Nos. 1 through 5 for providing signals T5-2 through T5-5 corresponding to the 5% point for streams Nos. 2, 3, 4 and 5, respectively, and for providing signals TEP1 through TEP5 corresponding to the true boiling points end points for streams Nos. 1 through 5, in accordance with voltages TS1 through TS5; IBP signal means connected to the Ts5 and TEP signal means for providing signals IBP2 through IBP5 corresponding to the true initial boiling point temperatures of streams Nos. 2 through 5, respectively, in accordance with signals T5-2 through T5-6; TC signal means connected to the T5 & TEP signal means and to the IBP signal means for providing signals TC1 through TC5 corresponding to the true target cut points of streams Nos. 1 through 5, in accordance with signals TEP1 through TEP5 and IBP2 through IBP6; and R network means connected to the TC signal means, to the switching means and to the flow rate sensing means for providing signals R1 through R5 in accordance with signals TC1 through TC5, signals A, B and FRC.

18. A signal generator as described in claim 17, in which the T5 & TEP signal means includes a plurality of T network means, each T network means receiving a different TS voltage and providing a TEP signal and a T95 signal, corresponding to the end point and 95% point temperatures for the stream associated with the TS voltage; and a plurality of summing means sums each T95 signal with a corresponding DC voltage associated with a gap for that particular stream, the summing means provides signal T5-2 to T5-6.

19. A signal generator as described in claim 18 in which each T network means receives DC voltages C10 through C16 and C21 and provides signal TEP and signal T95 in accordance with the following equations and the received signals and voltages:

$$TEPn = C10 + (C11)(T5n) + (C12)(T5n)^2 - (C21)(T5n)^4, \text{ and}$$

$$T95n = C13 + (C14)(TEPn) - (C15)(TEPn)^2 + (C16)(TEPn)^5.$$

20. A signal generator as described in claim 19 in which the IBP signal means includes a plurality of IBP network means, each IBP network means receiving a different T5 signal and direct current voltages C17 through C20 and provides a corresponding IBP signal in accordance with the received signal and voltages and the following equation:

$$IBPn = C17 + (C18)(T5n) - (C19)(T5n)^3 + (C20)(T5n)^5.$$

21. A signal generator as described in claim 19 in which the DC signal means includes a plurality of summing means for summing signals TEP1 and IBP2, TEP2 and IBP3, TEP3 and IPB4, TEP4 and IBP5 and TEP5 and IBP6; and a first plurality of dividing means receiving a DC voltage corresponding to a value of 2 for dividing the sum signals provided by the aforementioned plurality of summing means with the voltage to provide signals TC1 through TC5.

22. A signal generator as described in claim 21 in which the R signal means includes a first plurality of subtracting means for subtracting signal A from signals TC1 through TC5 to provide corresponding difference signals; a second plurality of dividing means connected to the first plurality of subtracting means on one-to-one basis and receiving signal B for dividing the signals from the subtracting means with signal B to provide corresponding signals YC1 through YC5 representative of the cummulative yield of streams Nos. 1 through 5, respectively; means connected to the dividing means for providing signal YC1 ad signal YT1, a second plurality of subtracting means cascade connected and receiving signals YT1, and YC2 through YC5 for subtracting signal YT1 from YC2 to provide a signal YT2, for subtracting signal YC2 from signal YC3 to provide a signal YT3, for subtracting signal YC3 from signal YC4 to provide a signal YT4, and for subtracting signal YC4 from signal YC5 to provide a signal YT5; and multiplying means receiving signals YT1 through YT5 for multiplying them with signal FRC to provide signals R1 through R5.

* * * * *

UNITED STATES PATENT AND TRADEMARK OFFICE
CERTIFICATE OF CORRECTION

PATENT NO. : 4,262,791
DATED : April 21, 1981
INVENTOR(S) : C. R. LYNCH; C. W. HARRISON; W. D. WHITE It is certified that error appears in the above—identified patent and that said Letters Patent is hereby corrected as shown below:

Column 14, line 26, "$Y3B = YA1 + YA2 + YA3$" should read --$X3B = YA1 + YA2 + YA3$--

Column 14, line 29, "$X4 = YA1 + YA2 + (0.5)(YA4)$" should read --$X4 = YA1 + YA2 + YA3 + (0.5)(YA4)$--

Column 15, line 18, "$E3 = C731 (C8)(G) + (C9)(G)^2$" should read --$E3 = C7 - (C8)(G) + (C9)(G)^2$--

Signed and Sealed this

Twenty-fifth Day of August 1981

[SEAL]

Attest:

Attesting Officer

GERALD J. MOSSINGHOFF

*Commissioner of Patents and Trademarks*